US011863622B2

(12) United States Patent
Ortiz et al.

(10) Patent No.: US 11,863,622 B2
(45) Date of Patent: Jan. 2, 2024

(54) CROSS-DEVICE DATA DISTRIBUTION WITH MODULAR ARCHITECTURE

(71) Applicant: DrumWave, Inc., Palo Alto, CA (US)

(72) Inventors: Santiago Ortiz, Palo Alto, CA (US); Daniel Aguilar, Palo Alto, CA (US); Javier Cruz San Martin, Palo Alto, CA (US); André Gustavo Vellozo Luz, Palo Alto, CA (US); Jeff Clark, Palo Alto, CA (US)

(73) Assignee: DRUMWAVE INC., Palo Alto, CA (US)

( * ) Notice: Subject to any disclaimer, the term of this patent is extended or adjusted under 35 U.S.C. 154(b) by 0 days.

(21) Appl. No.: 17/883,155

(22) Filed: Aug. 8, 2022

(65) Prior Publication Data

US 2022/0385727 A1 Dec. 1, 2022

Related U.S. Application Data

(63) Continuation-in-part of application No. 15/891,055, filed on Feb. 7, 2018, now abandoned.

(Continued)

(51) Int. Cl.
*H04L 67/1095* (2022.01)
*H04L 67/14* (2022.01)
*H04L 67/02* (2022.01)

(52) U.S. Cl.
CPC .......... *H04L 67/1095* (2013.01); *H04L 67/14* (2013.01); *H04L 67/02* (2013.01)

(58) Field of Classification Search
CPC ..... H04L 67/1095; H04L 67/14; H04L 67/02; H04L 67/125; G09G 2370/022;

(Continued)

(56) References Cited

U.S. PATENT DOCUMENTS

| 8,219,720 B2 * | 7/2012 | Saint-Hilaire .......... H04L 61/00 715/810 |
| 8,842,113 B1 * | 9/2014 | Holt ...................... G06F 3/1446 345/419 |

(Continued)

FOREIGN PATENT DOCUMENTS

WO   WO-2015200414 A1 * 12/2015 ........... G01S 5/0252

OTHER PUBLICATIONS

Brin, S., et al., (1998). "The anatomy of a large-scale hypertextual Web search engine" (PDF). Computer Networks and ISDN Systems. 30: 107-117. doi:10.1016/S0169-7552(98)00110-X. ISSN 0169-7552.

(Continued)

*Primary Examiner* — Alina A Boutah
(74) *Attorney, Agent, or Firm* — Pillsbury Winthrop Shaw Pittman LLP

(57) ABSTRACT

A method includes receiving identifiers of a set of computing devices to participate in a cross-device data visualization session; sending a data set to each computing device and instructions to display a first portion of the data set; receiving an interaction with one of the identified computing devices requesting another computing device to display a second portion of the data set; sending an instruction to display the second portion of the data set to the at least some of the other identified computing devices, where the instruction is sent without sending at least some of the second portion after receiving the interaction and the instruction causes the at least some of the other identified computing devices to execute the instructions on the at least some of the second portion of the data set that is present at the at least some of the other identified computing devices.

20 Claims, 15 Drawing Sheets

Related U.S. Application Data

(60) Provisional application No. 62/460,161, filed on Feb. 17, 2017, provisional application No. 62/460,163, filed on Feb. 17, 2017, provisional application No. 62/457,371, filed on Feb. 10, 2017, provisional application No. 62/457,408, filed on Feb. 10, 2017, provisional application No. 62/456,806, filed on Feb. 9, 2017, provisional application No. 62/455,762, filed on Feb. 7, 2017, provisional application No. 62/455,770, filed on Feb. 7, 2017.

(58) Field of Classification Search
CPC .. G09G 2370/06; G09G 5/12; G09G 2354/00; G09G 2356/00; G09G 2360/00; G06F 3/1423; G06F 3/0484; G06F 16/9577; G06F 16/954; G06F 16/986; G06F 2216/15

See application file for complete search history.

(56) References Cited

U.S. PATENT DOCUMENTS

| | | | |
|---|---|---|---|
| 9,244,912 B1 | 1/2016 | Kominac et al. | |
| 9,600,220 B2* | 3/2017 | Drake | G06Q 30/0267 |
| 9,684,434 B2 | 6/2017 | Lewin et al. | |
| 9,722,851 B1* | 8/2017 | Hill | H04L 9/40 |
| 9,727,298 B2 | 8/2017 | Naruse | |
| 10,318,320 B1* | 6/2019 | Thomas | G06F 9/45558 |
| 10,838,677 B1 | 11/2020 | Webster | |
| 2004/0004641 A1* | 1/2004 | Gargi | G06T 11/60 |
| | | | 715/848 |
| 2009/0160731 A1* | 6/2009 | Schuler | G06F 3/1423 |
| | | | 345/1.1 |
| 2010/0144283 A1* | 6/2010 | Curcio | H04W 4/02 |
| | | | 455/66.1 |
| 2010/0311393 A1* | 12/2010 | Castleman | H04L 67/14 |
| | | | 455/412.1 |
| 2011/0214063 A1* | 9/2011 | Saul | G06F 3/0481 |
| | | | 715/740 |
| 2012/0084663 A1 | 4/2012 | Momchilov et al. | |
| 2012/0151370 A1 | 6/2012 | Kominac et al. | |
| 2012/0191770 A1 | 7/2012 | Perlmutter et al. | |
| 2012/0206319 A1* | 8/2012 | Lucero | H04N 21/41407 |
| | | | 345/1.3 |
| 2013/0159784 A1 | 6/2013 | Rossi | |
| 2013/0194270 A1 | 8/2013 | Walls et al. | |
| 2014/0289118 A1 | 9/2014 | Kassemi et al. | |
| 2014/0302773 A1* | 10/2014 | Jantunen | H04N 21/4788 |
| | | | 455/3.01 |
| 2014/0372906 A1* | 12/2014 | Campbell | H04L 65/80 |
| | | | 715/753 |
| 2015/0113409 A1 | 4/2015 | Badger et al. | |
| 2018/0035126 A1* | 2/2018 | Lee | H04N 19/503 |
| 2019/0361657 A1* | 11/2019 | Einecke | G06F 3/1423 |
| 2022/0086536 A1* | 3/2022 | Pressnell | H04N 21/23439 |
| 2023/0008575 A1* | 1/2023 | Somlai-Fischer | G06F 3/017 |

OTHER PUBLICATIONS

QR-Vis: Embodied Interaction for Cross-Device Visualization, Anonymous authors, Submitted to IEEE InfoVis 2015, available at http://www.umiacs.umd.edu/~elm/projects/qrvis/qrvis.pdf.

Non-Final Office Action as issued in U.S. Appl. No. 17/959,842, dated Jun. 26, 2023.

* cited by examiner

CROSS-DEVICE DATA DISTRIBUTION WITH MODULAR ARCHITECTURE

CROSS REFERENCE TO RELATED APPLICATIONS

This patent is a continuation in part of U.S. patent application Ser. No. 15/891,055, which claims the benefit of U.S. Provisional Patent Application No. 62/455,770, filed 7 Feb. 2017, U.S. Provisional Patent Application No. 62/455,762, filed 7 Feb. 2017, U.S. Provisional Patent Application No. 62/456,806, filed 9 Feb. 2017, U.S. Provisional Patent Application No. 62/457,371, filed 10 Feb. 2017, U.S. Provisional Patent Application No. 62/457,408, filed 10 Feb. 2017, U.S. Provisional Patent Application No. 62/460,161, filed 17 Feb. 2017 and U.S. Provisional Patent Application No. 62/460,163, filed 17 Feb. 2017. Each of the parent filings above is incorporated by reference for all purposes.

BACKGROUND OF THE INVENTION

1. Field of the Invention

The present disclosure relates generally to computer systems and, more specifically distributed applications and related protocols.

2. Description of the Related Art

Across many industries, there has been an explosion of data. Companies have better information technology systems that provide low-latency access to vast amounts of structured (e.g., in relational or noSQL databases) and unstructured (e.g., in human-readable documents) data. Further, sensors and applications generate new data at tremendous rates and these data-generators are proliferating through the move toward paperless offices and deployment of sensor-laden industrial equipment and Internet-of-things appliances. And the available data is being shared at increasing rates, e.g., through various websites and application program interfaces.

To help make sense of this data, many companies and government entities have turned to data visualization applications. These applications ingest (often large amounts of) data and facilitate the presentation of that data in ways that efficiently communicate information and insights to human users. In some cases, these data visualization applications are used to generate visual graphics, like bar charts, plots, force-directed graphs, Voronoi diagrams, and the like to display aspects of data.

Often, these data visualization applications support cross-device use cases. Such applications are often configured to facilitate collaborative analysis and presentation of data through cross-device sharing of program state. For instance, a given distributed data visualization application might present an interface on a desktop computer with several different graphics and a tabular view of data, while a table computer may display one of the graphs selected on the desktop interface, in some cases, updating one display to reflect changes entered through the other. Examples include those described and cited in a paper titled QR-Vis: Embodied Interaction for Cross-Device Visualization, Anonymous authors, Submitted to IEEE InfoVis 2015, available at http://www.umiacs.umd.edu/~elm/projects/qrvis/qrvis.pdf, the contents of which are hereby incorporated by reference as one example of a cross-device data visualization application that may be improved upon with the techniques below.

These cross-device data visualization applications, however, are often too difficult and complex for users to configure. These challenges are often particularly vexing in the context of web-based data visualization applications, which often benefit from the wide user base of web browsers (and thus do not require a special purpose application be installed on every device), but which are also often particularly difficult for users to configure, as server-side logic is often much more difficult to reconfigure than settings in special-purpose applications.

Moreover, these cross-device data visualization applications, however, are often not well suited for analysis of large data sets. Often, users are relatively latency sensitive, e.g., delays as small as 200 milliseconds have been observed to materially decrease user engagement with various types of applications. Yet data visualizations often implicate large data sets that can take substantially longer for a given device to access, and this problem is often compounded in cross-device use cases where every device in a session seeks access to the same data.

Data formats, types and structures vastly vary, increasing the problem of communicating systems. Standards exist, but they tend to be specific for industry and solution. Within any organization, and across organizations, sharing and integrating data, is difficult. The single data format that's universal is the table, for which there are extensively used file formats (such as csv) and that can be exported from any widely used tool such as Excel or common databases. It's important to note that something even simpler, such a list of numbers, has no standard or widely adopted format (it has to be 'packed' into a table).

Websites main way of denoting a connection is via hyperlink. A website can point to another with a hyperlink (e.g., with a URL resolved to an IP address by a DNS, or directly with an IP address), and HTML along with the browser provides the mechanism to access the referenced website. This connection often does not allow any transfer of information from the target site back to the linking document.

Dimensionality reduction is an open problem in the field of computer science. A variety of approaches have been proposed and implemented, but they are lacking in various respects. Examples include analysis of variance (ANOVA) and various machine learning techniques for discovery features, like deep convolution neural nets and recurrent neural nets. Generally, these techniques are used to determine what relationships are important in a data set that typically includes a very large number of candidate relationships. However, approaches like ANOVA are often relatively slow for large numbers of candidate relationships, while many machine learning techniques deprive the analysis of insight into how a solution was reached, which might conceal implicit assumptions that lead to a relatively brittle result.

Mobile applications are executed in a variety of different computing devices, such as a cell phone, wearable computing device, or tablet computer. Generally, mobile applications are vetted and distributed by a trusted authority, such as an application store provider. The trusted authority often attempts to ensure that the mobile application does not engage in malicious behavior, and in many cases provides the operating system executing on the mobile device upon which the mobile application executes.

In many cases, it can be difficult for an application developer or provider to manage their mobile application instances that have been deployed. For example, it may be desirable for an application provider to delete or otherwise disable a deployed mobile application instance on a given mobile computing device upon some condition occurring. But in many cases, the security constraints imposed by trusted authorities that distribute mobile applications prevent the use of traditional techniques to manage deployed software, for instance various digital rights management techniques, or automated scripts that delete other programs. Further, many of these traditional techniques are not configured to delete or otherwise disable an application based on a context of the mobile computing device.

SUMMARY

The following is a non-exhaustive listing of some aspects of the present techniques. These and other aspects are described in the following disclosure.

1. Data Visualization Applications

Some aspects include a process of coordinating a cross-device data visualization session, the method comprising: receiving, by a computer system, identifiers of a set of computing devices to participate in a cross-device data visualization session; sending, by the computer system, a data set to each of the computing devices and instructions to display a first portion of the data set; receiving, by the computer system, an interaction with one of the identified computing devices requesting at least some of the other identified computing devices to display a second, at least partially different, portion of the data set; and sending an instruction to display the second, at least partially different portion of the data set to the at least some of the other identified computing devices, wherein the instruction is sent without sending at least some of the second portion after receiving the interaction and the instruction causes the at least some of the other identified computing devices to execute the instructions on the at least some of the second portion of the data set that is present at the at least some of the other identified computing devices, wherein the display of the first portion of the data set and the display of the second at least partially different portion of the data set displays different aspects of data visualization.

Some aspects include a process of accessing data in a cross-device data visualization session, the method comprising: receiving identifiers of a set of computing devices to participate in a cross-device data visualization session; sending a data set to each of the computing devices and instructions to display a first portion of the data set; receiving an interaction with one of the identified computing devices requesting at least some of the other identified computing devices to display a second, at least partially different portion of the data set; and sending an instruction to display the second, at least partially different portion of the data set to the at least some of the other identified computing devices, wherein the instruction is sent without sending at least some of the second portion after receiving the interaction.

Some aspects include a process of coordinating a cross-device data visualization session, the process including: receiving information in a first data structure; receiving instructions to transform the information into a second data structure different from the first data structure; in response to the instructions, selecting a decoder corresponding to the first data structure and an encoder corresponding to the second data structure; and transforming the information from the first data structure to the second data structure with the selected decoder and the selected encoder.

Some aspects include a process of coordinating a cross-device data visualization session, the process including: obtaining a directed graph specifying a plurality of modules executing on a plurality of computers, edges of the graph indicating communication from one module to another among the plurality of modules; receiving, from a first module among the plurality of modules, an output of the first module; analyzing the directed graph to determine whether another module among the plurality of modules has completed an operation; and after determining that the other module has completed the operation, sending the output to a second module among the plurality of modules.

2. Application Layer Protocols

Some aspects include a process of communicating between websites, the method comprising: obtaining markup and a script that, at least in part, define a first webpage accessible at a first domain; receiving, from a server at the first domain, a request for the first webpage from a client computing device web browser; sending to the client computing device, the first webpage including the markup and the script, wherein the sent script includes: an asynchronous event handler configured to: process data-received events received via steps for circumventing a same-origin policy of the browser; and update a document object model of the first webpage based on data received from a server at a second domain, different from the first domain via one or more processed data-received events.

Some aspects include a process of communication between websites, the method comprising: operating, by a computer system, a first webpage accessible at a first domain and a second webpage accessible at a second domain; receiving, by the computer system, a first data input at the first webpage; updating, by the computer system, a first visualization provided on the second webpage based on the first data input; and displaying, by the computer system on a display, the updated first visualization on the second webpage.

Some aspects include a process of preparing a visualization to assist in subsequent selections of data analysis techniques, the method comprising: obtaining a data set having more than five dimensions; identifying and converting numeric dimensions into categorical dimensions by quantizing values in the numeric dimensions; calculating respective entropies for values in each dimension; forming a matrix in which rows and columns each correspond to one of the dimensions, wherein each dimension uniquely corresponds to at least one row and to at least one column, and wherein values of the adjacent matrix are determined by calculating two values between the dimensions at a given row and column of the matrix indexing the calculated two values, the two values including: information gain values ig(A,B) and ig(B,A), that indicate how much entropy decreases when one split one variable using the values of the other; pruning the matrix by, for each information gain value, above a threshold, create a directed relation; and calculating a measures of network centrality for the dimensions of the pruned matrix.

3. Self-Disabling and Self-Deleting Mobile Applications

Some aspects include a process of disabling or deleting a mobile application, comprising: obtaining an application with a disablement routine having disablement criteria; determining, at a first time, with the disablement routine, that the criteria are not satisfied and, in response, executing the application; and determining, at a first time, with the disablement routine, that the criteria are not satisfied and, in response, preventing the application from executing.

With respect to each in each of the above subsections, some aspects include a tangible, non-transitory, machine-readable medium storing instructions that when executed by a data processing apparatus cause the data processing apparatus to perform operations including the above-mentioned process.

With respect to each in each of the above subsections, some aspects include a system, including: one or more processors; and memory storing instructions that when executed by the processors cause the processors to effectuate operations of the above-mentioned process.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above-mentioned aspects and other aspects of the present techniques will be better understood when the present application is read in view of the following figures in which like numbers indicate similar or identical elements.

Figure 1:
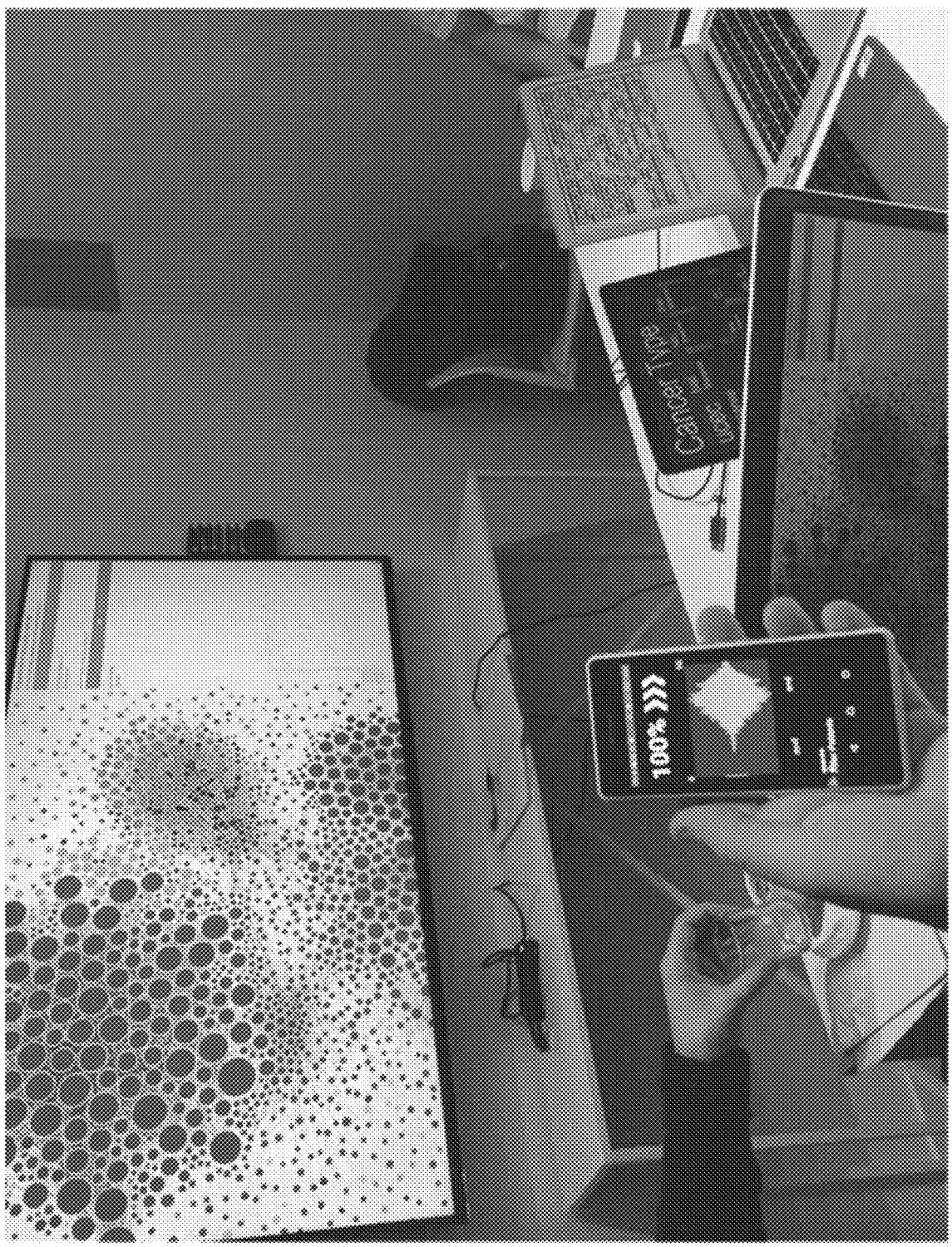
FIG. 1 illustrates an example use case with multiple displays in a cross-device data visualization session.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science, data visualization application development or human computer interaction. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Several independently useful inventions are described below. These inventions may be used synergistically together, but it should be emphasized that they need not be combined. In other words, the claims should not be read to require that each invention described in this patent be present, as the claims may focus on only one or a combination of a subset of the inventive techniques described herein. Indeed, the inventors expect to file several versions of this disclosure in different patents to target different aspects of the described subject matter.

1. Multiple Screen Applications

Although multiple-screen applications exist in various contexts, including Business Intelligence, analytics and data visualization, these systems tend to be rigid in that the different views are often fixed, new views cannot be created or added on the run, and adding new views is often technically very difficult.

The protocol and systems that implement the protocol described below are useful in a variety of contexts. An example use case is described with reference to data visualization applications, but a variety of other uses are contemplated. Some embodiments provide a way to create multi-screen data applications, in which multiple Business Intelligence (BI) dashboards, interactive information visualization applications and, in general, any data application, share data across devices and thus create multiple screens user experience. In some embodiments, interaction on one screen affects the others. In some embodiments, it is extremely easy to add and remove devices.

A variety of different devices that can be agglomerated to form a multi-screen data application: desktop computers, portable computers, tablets, smartphones, smartwatches, virtual reality goggles. In general: any device capable to process data, display it on a screen and capture user interaction, including internet of things (IoT) appliances, like voice-responsive computer hubs, smart televisions, smart door locks, smart thermostats, and the like.

An example result of such agglomeration is a series of screens displaying different contents and that feel and behave as a single system. For instance, an input on one device may cause a display on both that device and a display on other grouped devices to update to reflect the input, e.g., to resize a graph, select a subset of a graph, adjust a filter, present a different view of data, view different data, or the like.

Embodiments may implement these (and other) techniques with the following features:
- each screen belongs to an independent device, in some embodiments;
- devices can be added and removed organically from the multiple screens applications, in some embodiments;
- applications in each device can be developed independently (in different devices, by different developers), in some embodiments; and
- there is no distance restriction—devices can be located in different and distant places, in some embodiments.

This approach, in some cases, affords a number of benefits and features:
- an analyst developer that builds BI dashboards, interactive visualizations, data analysis interfaces or any data application, to create multiple views that could communicate as a grouped and bigger (multi-screens and multiprocessor) data application, in some embodiments;
- different analyst users could operate synchronously, in the same multi-screen data application, working collaboratively and also in the same physical space (each analyst may operate its own device or subset of devices), in some embodiments;
- different analyst developers could produce different data applications that, seamlessly and organically, can be added or removed from a multi-screen data application. In some cases, each data application is autonomous and useful by itself, but it can also connect with any other data application (that uses the same data protocol) or any already assembled multi-screen application, in some embodiments;
- multi-screen applications can exist remotely, so analysts in different physical places can cooperate synchronously working on different devices, in some embodiments; and
- remote conferences in which one user controls part of the multi-screen application and affect what happens in other remote location, in some embodiments.

In some embodiments, the system includes a modular architecture. In some embodiments, different data modules (that could be analytical, visual and often interactive) connect to share information. A group of data modules are grouped, forming a layout, and produce a data application (a BI dashboard, or an interactive visualization). The user interaction on a single module generates new data that may be used by other modules. An example configuration of modules is a "cascade of filters": the modules are arranged sequentially and each filters data that will be received by the consecutive one. Other arrangements are possible, such as one in which each module is connected to all others.

In some embodiments, the modules connect to one another through an Applications Connector Module. The Applications Connector Module may receive data from any other module (e.g., directly, via a WebRTC data connection or indirectly via server that manages state for the cross-device session, in some cases via periodic pull request or via a push from the sender, for instance with a duplex connection) and send (e.g., via secure Internet Sockets, for instance with duplex communication via Web Sockets, or with the other previously mentioned techniques) data to other modules, within or outside the device. This module is the connector that facilitates the creation of meta-applications, in some embodiments. The module sends and receives data formatted in efficient ways.

In some embodiments, each computing device in a given session may download from a server, with a browser or special-purpose application in which one or more modules are executed, an Application Connector Module/Controller and a manifest, listing modules to be executed at the respective device (which may be parsed and the corresponding modules may then be retrieved). A plurality of such devices may form a cross-device session, e.g., by registering their port and IP addresses with one another or with the server (e.g., in some cases, with a web of WebRTC data connection to facilitate relatively fast communication that do not need to pass through a server, or in some cases, by routing the connections through a server). In some cases, some modules may ingest data, process the data, and present a view of the data (e.g., a graphical visualization) with various user inputs (and corresponding event handlers) with which users may interact. In some embodiments, users in a session may have various roles (which may change over time in some cases), e.g., a user in a designated role may input a command to their respective computing device that adds other computer devices to a session and causes those other computing devices to download one or more modules to effectuate a device-specific data visualization. In some cases, such displays may be scripted in advance, e.g., for a presentation.

In some embodiments, the modular architecture implements an efficient data format for cross-device data-visualization interactions, described in the provisional patent applications incorporated by reference above, particularly U.S. Provisional Patent Application No. 62/455,770 entitled Efficient Transformation Data Protocols.

In some embodiments, a user may interact with a user interface on a device to change a data visualization, e.g., select an icon, change a view on data, zoom/pan in a graph, change which data is displayed, etc.

Some embodiments implement a data model that is expected to be more efficient than traditional techniques for connecting multiple data applications that have access to the same datasets. Instead of transferring big blocks of data, in some embodiments, the data sent and received by the various computing devices (e.g., the connector modules in the modular architecture described below) describes a series of data processes to obtain the desired dataset from the original ones.

It is common that multiple systems or applications load and process synchronously the same data. It is less common, but possible, that those applications communicate, and that a transformation processes (such as filtering) in one application should be replicated across other applications. These applications could run in different client-side computers or servers.

Normally, when applying a transformation over a big dataset, even if a system is filtering or dimension reducing, the resulting dataset is still quite big. This makes difficult the communication across different applications that are meant to be synchronized in respect to those transformations, especially if they run in different terminals or servers.

Some embodiments implement a protocol to communicate filtering and other data transformation information across different applications, based on a very light data format. This is expected to allow for fast synchronization on among the connected applications, in some implementations.

Instead of transferring big blocks of data, in some embodiments, the data sent and received by the connector module describes a series of data processes to obtain the desired dataset from the original ones. The app that receives from a user the transformation command quickly spreads the light information to the connected apps. The user experience, in some embodiments, is then that the user is interacting upon the constellation of connected apps, not on a single one.

Figure 2:
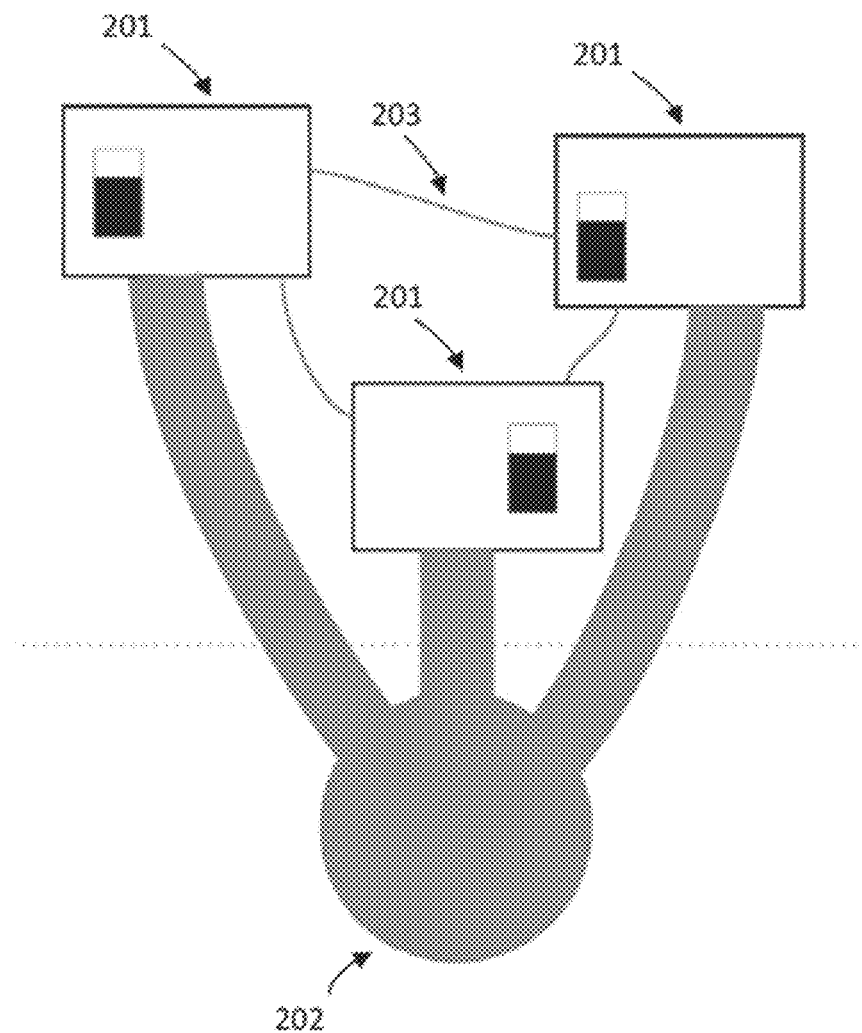
FIG. 2 illustrates the comparably large data size needed for loading information on different computers versus the small data size exchanged between computers for synchronization according to some of the techniques herein.

An example is shown in FIG. 2. There are two data applications, running on independent PCs 201, but both working with the same large table 202. In one application, the user filters by selecting a categorical value, e.g., California from a list of States. The resulting table is smaller but still big. Instead of sending this resulting table to the connected data application, the connector module sends the information 203 of how the large table has being filtered. This information is extremely light and thus arrives immediately to the second application. The lightness of this information is illustrated in FIG. 2 by the thinness of the connection between the computers. The second data application, running on the second PC 201, receives the data formatted as filtering information, and then a second module executes the filter and produces the desired table that is sequentially visualized. The user can choose to change terminals and operate on another screen. The user is acting upon a connected system in which all the parts are synchronized (with none or barely noticeable delay).

This protocol is, in some embodiments, also suitable to communicate between client terminals and servers and is not limited to peer-to-peer communications applications (this does not suggest any other description within the specification is intended to be limiting).

The efficient transformation protocol is, in some embodiments, accompanied by a series of server side and client-side functionalities that, for instance, join multiple filtering and transformation objects, translate these objects to SQL and vice-versa.

In some cases, each computing device may hold in cache memory a data set that is independent of the data being visualized, e.g., it may be larger than the data currently depicted by the respective device, and the depicted data may be a subset of what is in the cache. Embodiments may receive a filter (or message indication some other transformation), determine that that indicated transformation can be performed on the data resident in cache memory, and perform that transformation, in some cases, without incurring a delay by requesting new or different data. In some cases, a transformation may implicate more data than is resident in cache memory, and some embodiments may display a subset of the data, request the remaining data, and update a display as it is received. In some embodiments, a computing device of a user leading a presentation may specify data for the other devices in a session to hold in cache memory. As users interact with the data visualizations, it is expected that data visualizations may be relatively quickly updated based on the cache data.

In some browser-based implementations, user devices may constrain the amount of memory available for a given domain (e.g., local Storage is often limited to 5-to-10 MB per domain for security purposes, to prevent untrusted websites from impairing device performance). In some embodiments, additional memory of the client device may be accessed via the IndexedDB API, which in some cases, may also cause the client device to index the data to afford relatively fast queries. In some embodiments, data may be maintained at rest in encrypted format on the client devices (and sent in encrypted format), e.g., with the WebCrypto API in some browser-based implementations.

In some cases, some embodiments may store cache data both in a local Storage object and native cache memory of the browser in order to have more room for larger data sets. In some cases, localStorage objects are substantially faster to access (e.g., with less than ⅓ the latency) than native browser cache, so some embodiments may arrange data between these two forms of client-side storage to position data more likely to be accessed in the local Storage object (e.g., data adjacent that currently displayed in a data visualization, either in spatial dimensions of the display to accommodate zooming or panning, or adjacent in a graph to accommodate pivots).

In some cases, the different displays may be differently sized and the different computing devices may have different computing resources. Some embodiments may perform content negotiation to select modules for a device based on these resources or select attributes of a display for a given module based on such factors.

Some embodiments implement an engine that manages the flow of data among a series of connected modules that receive and deliver data in certain structures.

Based on a modular data grammar (an example of which is described below) that comprises a small (e.g., less than 30) number of data structures, and a scalable set of modules that convert those data structures into other data structures, the data modular engine is capable of running sophisticated data applications, in some embodiments.

Each module, in some embodiments, receives the output of others and delivers output to others. Each module, in some embodiments, has rules for obligatory and optional entrances of data (inlets), and optional outcomes of data. Each input and outcome, in some embodiments, belong to data structure from the grammar.

A series of modules, in some embodiments, are then connected forming a directed graph. A simple and typical graph has no loops, and modules contain only one output. Modules are activated, and deliver data, for one or more of these reasons or others:

they loaded external data (e.g., a loader module loading a csv and delivering a table);
 they capture data from a sensor (e.g., a photovoltaic cell sending resistance changes through time, and delivering Number or NumberList);
 they capture users' behavior (e.g., a module capturing selection from a list, or mouse position);
 they periodically send data (e.g., a counter);
 they commonly receive data, process the data, and deliver results.

The engine, in some embodiments, receives data coming from outlets and delivers the data to inlets. But instead of following this process linearly, in some embodiments, it analyzes the structure of the network, holds part of the data, and wait until other modules process data to deliver. The objective of the engine, in some embodiments, is making it less likely (or avoiding entirely) that a module will be activated more than once.

Figure 5A:
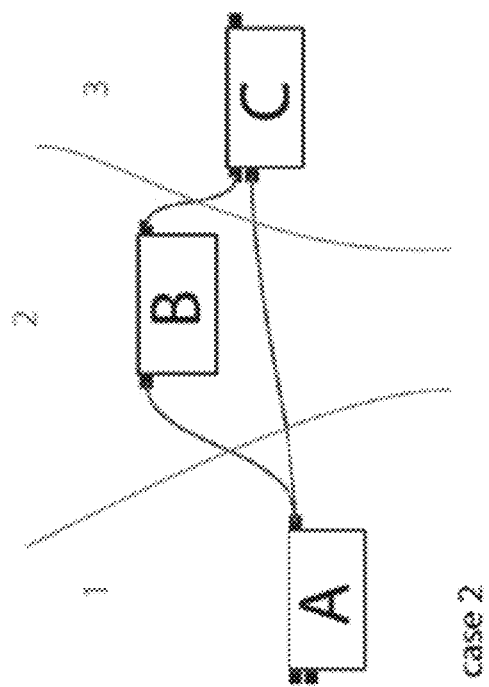
FIG. 5A illustrates a case in which multiple modules are interconnected and information from one module is transmitted directly to two modules.
Figure 5B:
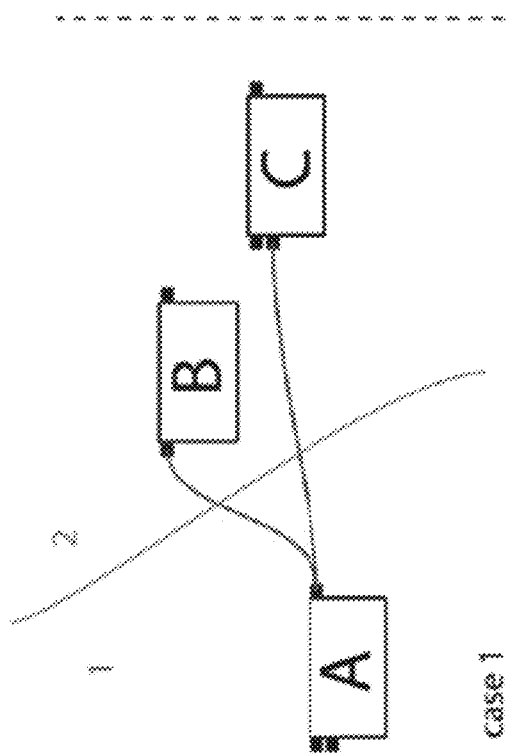
FIG. 5B illustrates a case in which multiple modules are interconnected and information is from two modules is transmitted to one module.

FIGS. 5A and 5B show examples of two different cases. In the first case shown in FIG. 5A, 3 modules are connected in a simple graph. When A is activated and delivers data, B and C receive the data and are activated right away. In the second case shown in FIG. 5B, slightly more complex, when A is activated, the engine detects that C will receive the products of A and B, so instead of activating B and C, it activates only B, and once B delivers data C is finally activated receiving from A and B. This way C was activated only once. The engine manages much more complex cases, always guaranteeing efficient processing, in some embodiments, and in particular activating a module only once, once all the precedent modules have been activated.

Some embodiments implement this engine in Javascript, but the engine is programming language agnostic, and the set of rules can be deployed in any language. In the same vein, modules can be built with any programming language and installed in any type of machine, including computers, servers, phones or any object with a chip, such as an Internet-of-things (IoT) appliance. As long as those modules receive and deliver data in the form of the mentioned data types conforming the data grammar, any engine can orchestrate any set of modules in any device.

In an example, two engines (that could be in different machines and deployed in different programming languages) can cooperate, co-forming a higher-level engine that operates following the same rules. In other words, the engine logics are additive, in some embodiments. An example configuration may have an engine on a computer co-operating with an engine on a server, orchestrating processes on the computer and on the server.

Embodiments of this invention are expected to have enormous potential for Internet of things, to the extent that a group of devices can interoperate autonomously if one or more of them run engines, and many other use cases are contemplated. The engine is a new paradigm of distributed computation, in some embodiments.

Some embodiments instantiate a series of data structures (e.g., each structure with its own format), along with a series of operations, that in some embodiments have the following features:
  Independently store information of that data structure (example: numberList, dateList, point or polygon);
  Each can be transformed into many others (e.g., date can be converted into number, by counting milliseconds from a certain date, and thus, dateList can be transformed into numberList);
  Some can be joined to form another (by example multiple lists such as stringLists, dateLists, numberLists, can be assembled to form a table; and by further example points assemble to form a polygon);
  In general, those structures can be combined in meaningful ways.

The number of data structures is small, around 25. This number comparable to the number of phonemes in many languages, including English, the number of characters in many alphabets, and the number of amino acids that form human proteins, and the comparison is not anecdotal since it seems to define an ideal number that balances simplicity and overwhelming combinatorial complexity.

Based on this small list of data structures, the grammar is completed by a series of modules that operate with them. These modules come in different categories:
  decoders: convert raw data (text) into a data structure (example csv into table);
  encoders: convert a data structure into text;
  transformers: convert a data structure into another (date into number), usually a reversible operation since information is not lost on the process;
  assemblers: take several data structures to create another (information is preserved);
  disassemblers: split a data structure into multiple (information is preserved);
  operators: take one or multiple data structure to produce a data structure based on certain algorithm or process (information is not preserved);
  controls: receive data structures and allow human intervention for specific selection, filtering or transformation processes (e.g., select a range of numbers within a numberList), deliver data structures;
  Interactive visualization: receive data structures and produce interactive visualizations, human intervention produces data structures.

The data structures, along with the modules, create a grammar in some embodiments. Of note, in some embodiments, every module receives data structures and delivers at least one data structure. This, in some embodiments, allow for flows of data that are being transformed and enriched and that can (e.g., always) be connected to other modules.

Visualizations are typically 'dead-ends' that reach human perception and do not generate new data, within this grammar, this is no longer the case in some implementations.

Figure 6:
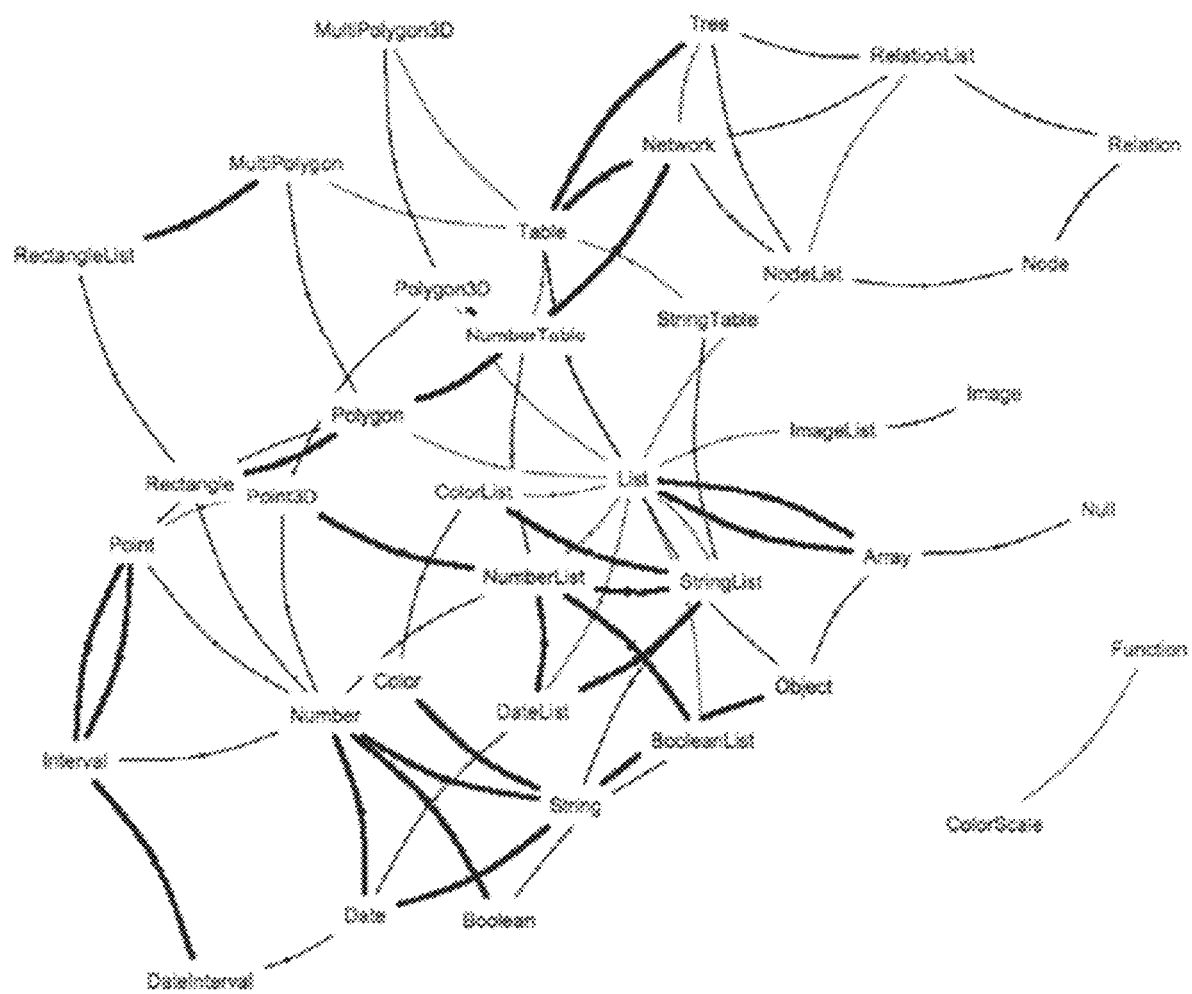
FIG. 6 illustrates data structure relations possible through sharing of information according to some of the techniques herein.

An exemplary implementation is shown in FIG. 6. Within organizations, when these data structures become internal standards, sharing information and connecting systems (analysis and visualization software and middleware, databases, interfaces) is expected to become easier, and via the endless combinatorial possibilities, way more productive. These combinatorial possibilities are shown in FIG. 6, where the heavy lines show relations and the lighter lines indicate transformations. Adoption of this grammar, and any system compatible, fosters acceleration of processes, better communication and better collaboration.

FIG. 1 shows an example use case, in which four different display screens display three different views on a data set. Interactions with one of these displays, e.g., to select a given data point or cluster icon, may cause the other displays to automatically update to display a responsive view on the data.

Figure 8:
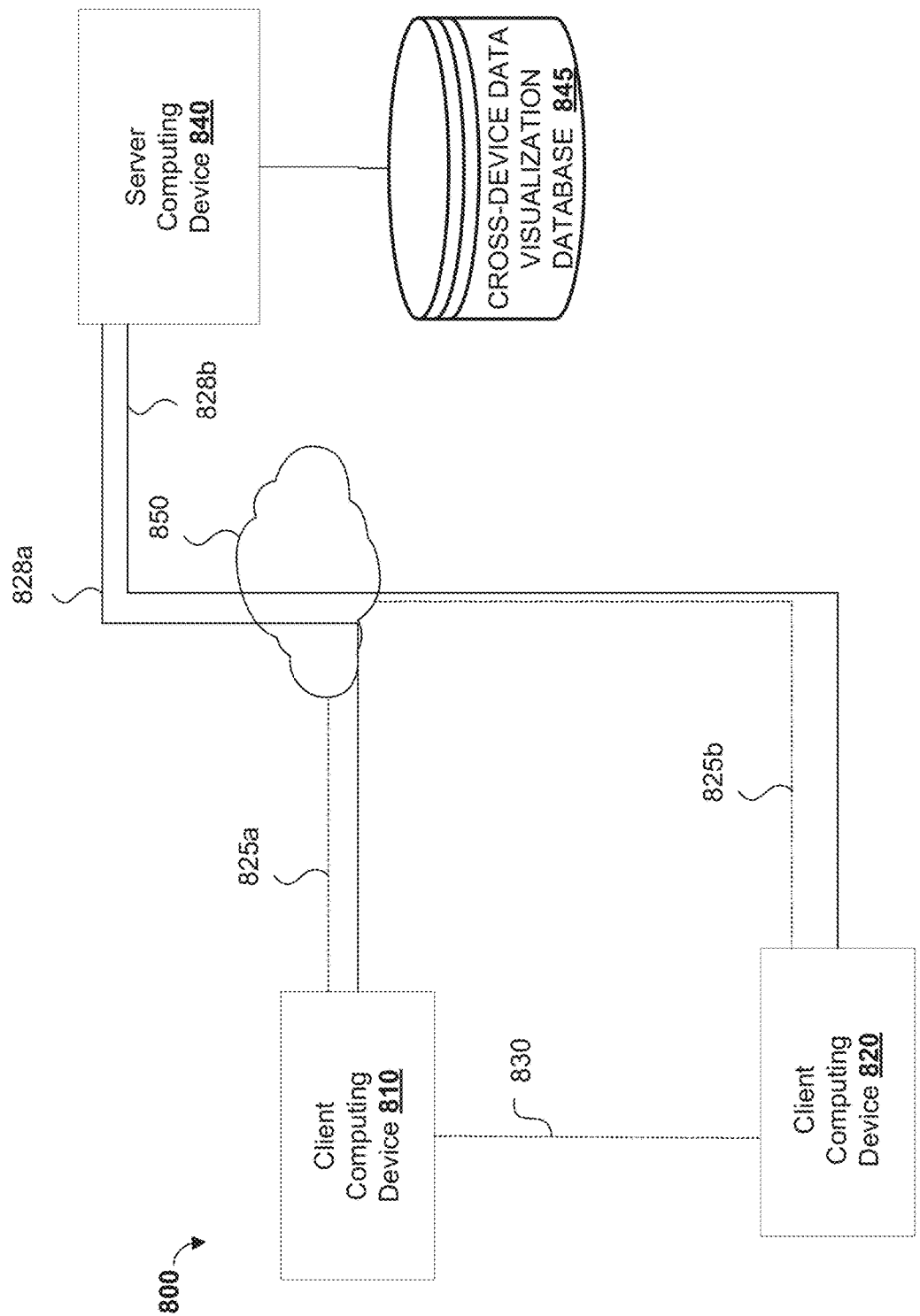
FIG. 8 is a schematic view illustrating an embodiment of a cross-device data visualization system, in accordance with some embodiments of the present disclosure.

FIG. 8 illustrates an embodiment of a cross-device data visualization session system 800 is illustrated. In the illustrated embodiment, the cross-device data visualization session system 800 includes a client computing device 810 and a client computing device 820) (e.g., autonomous/non-autonomous vehicles, transportation devices, tablets, laptops, smart phones, wearables, and/or other client computing devices that would be apparent to one of skill in the art in possession of the present disclosure). The client computing devices 810 or 820 may be used to collect, receive, or send data at the client computing device 810 or 820 to or from a central monitoring station for further analysis or action using common networking and communication techniques, commonly specified 5G or subsequently developed adaptive multi-bandwidth approaches. As such, the client computing device 810 or the client computing device 820 may include communication units having one or more transceivers to enable the client computing device 810 and the client computing device 820 to communicate with each other or a server computing device 840 via a network 850. Accordingly, and as discussed in further detail below, the client computing device 810 may be in communication with the client computing device 820 directly or indirectly. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the client computing device 810 or the client computing device 820 in the cross-device data visualization session system 800 of FIG. 8 may include first (e.g., relatively long-range) transceiver(s) to permit the client computing device 810 or the client computing device 820 to communicate with the network 850 via a communication connection 825*a* and a communication connection 825*b*. The communication connection 825*a* may provide a communication channel 828*a* between the client computing device 810 and a server computing device 840, and the communication connection 825*b* may provide a communication channel 828*b* between the client computing device 820 and the server computing device 840. The communication channels 828*a* and 828*b* may be generated according to a full-duplex communication protocol such as, for example, Web Socket, and/or any other full-duplex communication protocol that would be apparent to one of skill in the art in possession of the present disclosure. The network 850 may be implemented by an example mobile cellular network, such as a long-term evolution (LTE) network or other third generation (3G), fourth generation (4G) wireless network, or fifth-generation (5G) wireless network. However, in some examples, the network 850 may be additionally or alternatively be implemented by one or more other communication networks, such as, but not limited to, a satellite communication network, a microwave radio network, wired communication systems, Wi-Fi communication systems, and/or other communication networks.

The client computing device 810 or the client computing device 820 additionally may include second (e.g., relatively short-range) transceiver(s) to permit the client computing device 810 or the client computing device 820 to communicate with each other via a direct communication connection 830. Furthermore, the second transceiver may be used for client computing device-to-client computing device communications between the client computing device 810 and the client computing device 820. In the illustrated example of FIG. 8, such second transceivers are implemented by a type of transceiver supporting relatively short-range (e.g., operate at distances that are shorter than the long-range transceivers) wireless networking. For example, such second transceivers may be implemented by a Wi-Fi transceiver (e.g., via a Wi-Fi Direct protocol), a Bluetooth® transceiver, an infrared (IR) transceiver, a Zigbee transceiver, and/or other transceivers that are configured to allow the client computing device 810 and/or the client computing device 820 to intercommunicate via the communication connection 830 or a Local Area Network (LAN).

The cross-device data visualization session system 800 also includes or may be in communication with a server computing device 840. For example, the server computing device 840 may include one or more servers, storage systems, cloud computing systems, and/or other computing devices (e.g., desktop computing device(s), laptop/notebook computing device(s), tablet computing device(s), mobile phone(s), etc.). The server computing device 840 may be coupled to a cross-device data visualization database 845 that is configured to provide repositories such as session members and device identifiers, a data set and the data structures for that data set, instructions, data modules, transformations, and/or any other data or instructions for cross-device data visualization that would be apparent to one of skill in the art in possession of the present disclosure.

Also, the server computing device 840 may be configured to computationally process sensor data (e.g., sensor data that includes environmental information, client computing device information, user or data inputs, or other information) received from the client computing device 810 or the client computing device 820 and render instructions to the client computing device 810 or the client computing device 820. While a cross-device data visualization session system 800 has been illustrated and described, one of skill in the art in possession of the present disclosure will recognize that the teachings of the present disclosure will be beneficial for a variety of cross-device data visualization session systems that would be apparent to one of skill in the art in possession of the present disclosure and, as such, a wide variety of modifications to the number, types, and orientation of devices in the cross-device data visualization session system 800 will fall within the scope of the present disclosure as well.

Figure 9:
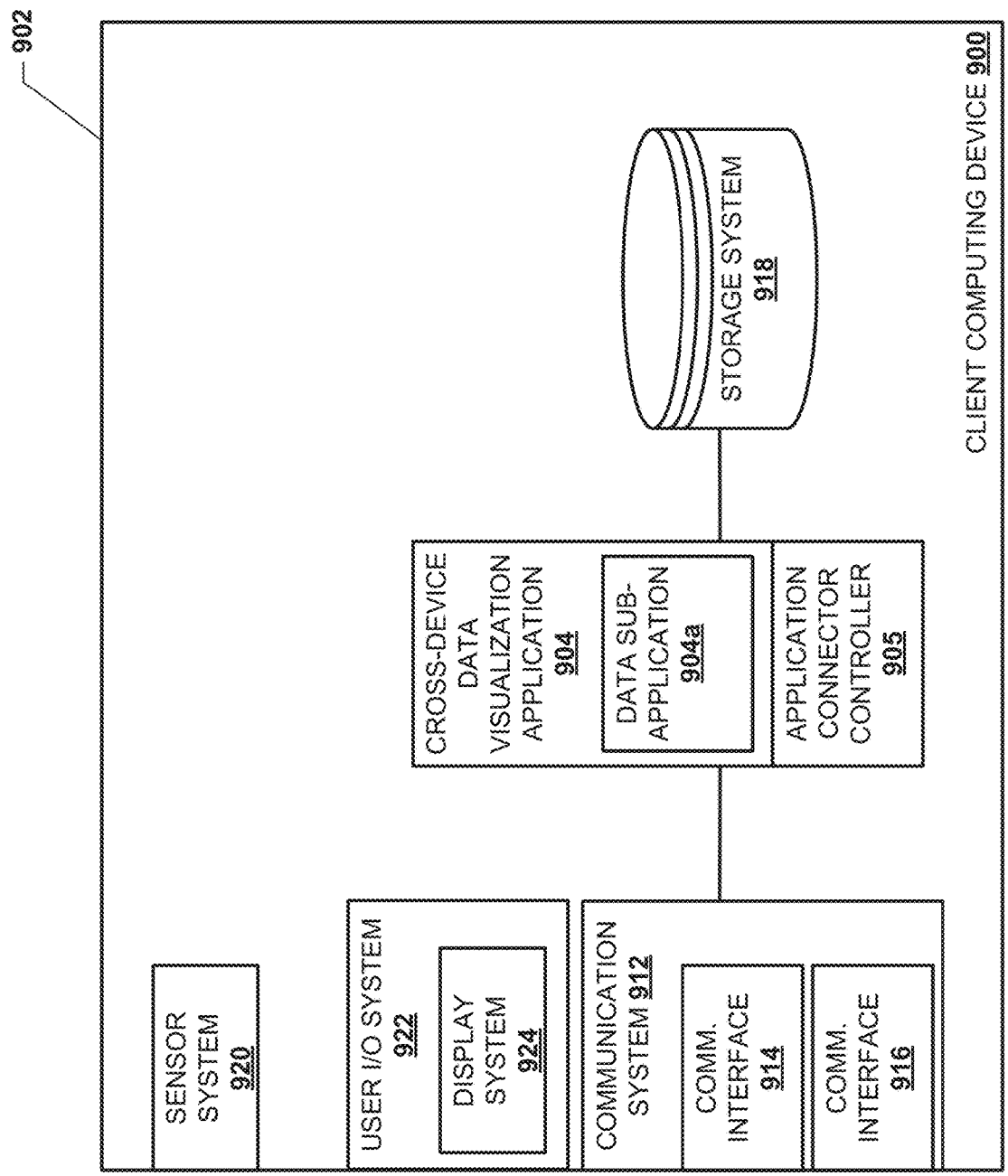
FIG. 9 is a schematic view illustrating an embodiment of a client computing device used in the cross-device data visualization system of FIG. 8, in accordance with some embodiments of the present disclosure.

FIG. 9 illustrates an embodiment of a client computing device 900 that may be the client computing device 810 or 820 discussed above with reference to FIG. 8. In the illustrated embodiment, the client computing device 900 includes a chassis 902 that houses the components of the client computing device 900. Several of these components are illustrated in FIG. 9. For example, the chassis 902 may house a processing system (not illustrated) and a non-transitory memory system (not illustrated) that includes instructions that, when executed by the processing system, cause the processing system to provide a cross-device data visualization application 904 that is configured to perform the functions of the cross-device data visualization application or the client computing devices discussed below. The cross-device data visualization application 904 may include one or more data sub-applications 904*a* (also referred to as data modules herein). The cross-device data visualization application 904 and the data sub-applications 904*a* may be distributed across the client computing devices 810 and 820 of FIG. 8. The instruction may cause the processing system to further provide an application connector controller 905 that is configured to perform the functions of the application connector controllers, or the client computing devices discussed below. The application connector controller 905 may that receives data from any other data sub-applications and sends (via a secure Internet Sockets) data to other data sub-applications, within or outside the device. This application connector controller 905 is the connector that makes possible the creation of meta-applications. The application connector controller 905 sends and receives data formatted in efficient ways.

The chassis 902 may further house a communication system 912 that is coupled to the cross-device data visualization application 904 or the application connector controller 905 (e.g., via a coupling between the communication system 912 and the processing system). The communication system 912 may include software or instructions that are stored on a computer-readable medium and that allow the client computing device 900 to send and receive information through the communication network, discussed above. For example, the communication system 912 may include a first communication interface 914 to provide for communications through the network 850 as detailed above (e.g., first (e.g., long-range) transceiver(s)). In an embodiment, the first communication interface 914 may be a wireless antenna that is configured to provide communications with IEEE 802.11 protocols (Wi-Fi), cellular communications, satellite communications, other microwave radio communications and/or communications. The communication system 912 may also include a second communication interface 916 that is configured to provide direct communication with the client computing device 910 or other computing devices within the physical environment discussed above with respect to FIG. 8 (e.g., second (e.g., relatively short-range) transceiver(s)). For example, the second communication interface 916 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 902 may also house a storage system 918 that is coupled to the cross-device data visualization application 904 or the application connector controller 905 through the processing system. The storage system 918 may store sensor data, a data set and its included one or more data structures, a data sub-application manifest, transformations, and/or any other instructions and/or information that would be apparent to one of skill in the art in possession of the present disclosure.

In various embodiments, the client computing device 900 may include a sensor system 920 that may be housed in the chassis 902 and/or provided on the chassis 902. The sensor system 920 may be coupled to the cross-device data visualization application 904 or the application connector controller 905 via the processing system. The sensor system 920 may include one or more sensors that gather sensor data about the client computing device 900 or the physical environment that may be provided to the cross-device data visualization application 904 or the application connector controller 905. For example, the sensor system 920 may include a camera, a proximity sensor, a temperature sensor, an inertial measurement unit (IMU), a geolocation sensor (e.g., a global positioning system (GPS), and/or any other sensor that would be apparent to one of skill in the art in possession of the present disclosure.

In various embodiments, the chassis 902 also houses a user input/output (I/O) system 922 that is coupled to the cross-device data visualization application 904 or the application connector controller 905 (e.g., via a coupling between the processing system and the user I/O system 922). In an embodiment, the user I/O system 922 may be provided by a keyboard input system, a mouse input system, a track pad input system, a touch input display system, and/or any other input system. In an embodiment, the user I/O system 922 may include a user output subsystem such as, for example, a haptic feedback device, a speaker, a light (e.g., an LED) and/or any other user output subsystem that would be apparent to one of skill in the art in possession of the present disclosure. In various embodiments, the user I/O system 922 may also include a display system 924 that is coupled to the cross-device data visualization application 904 or the application connector controller 905 (e.g., via a coupling between the processing system and the display system 924). In an embodiment, the display system 924 may be provided by a display device that is integrated into the client computing device 900 and that includes a display screen (e.g., a display screen on a laptop/notebook computing device, a tablet computing device, a mobile phone, or wearable device), or by a display device that is coupled directly to the client computing device 900 (e.g., a display device coupled to the client computing device 900 by a cabled or wireless connection). While a client computing device 900 has been illustrated and described, one of skill in the art in possession of the present disclosure will recognize that the teachings of the present disclosure will be beneficial for a variety of client computing devices and, as such, a wide variety of modifications to the number, types, and orientation of devices and modules in the client computing device will fall within the scope of the present disclosure as well.

Figure 10:
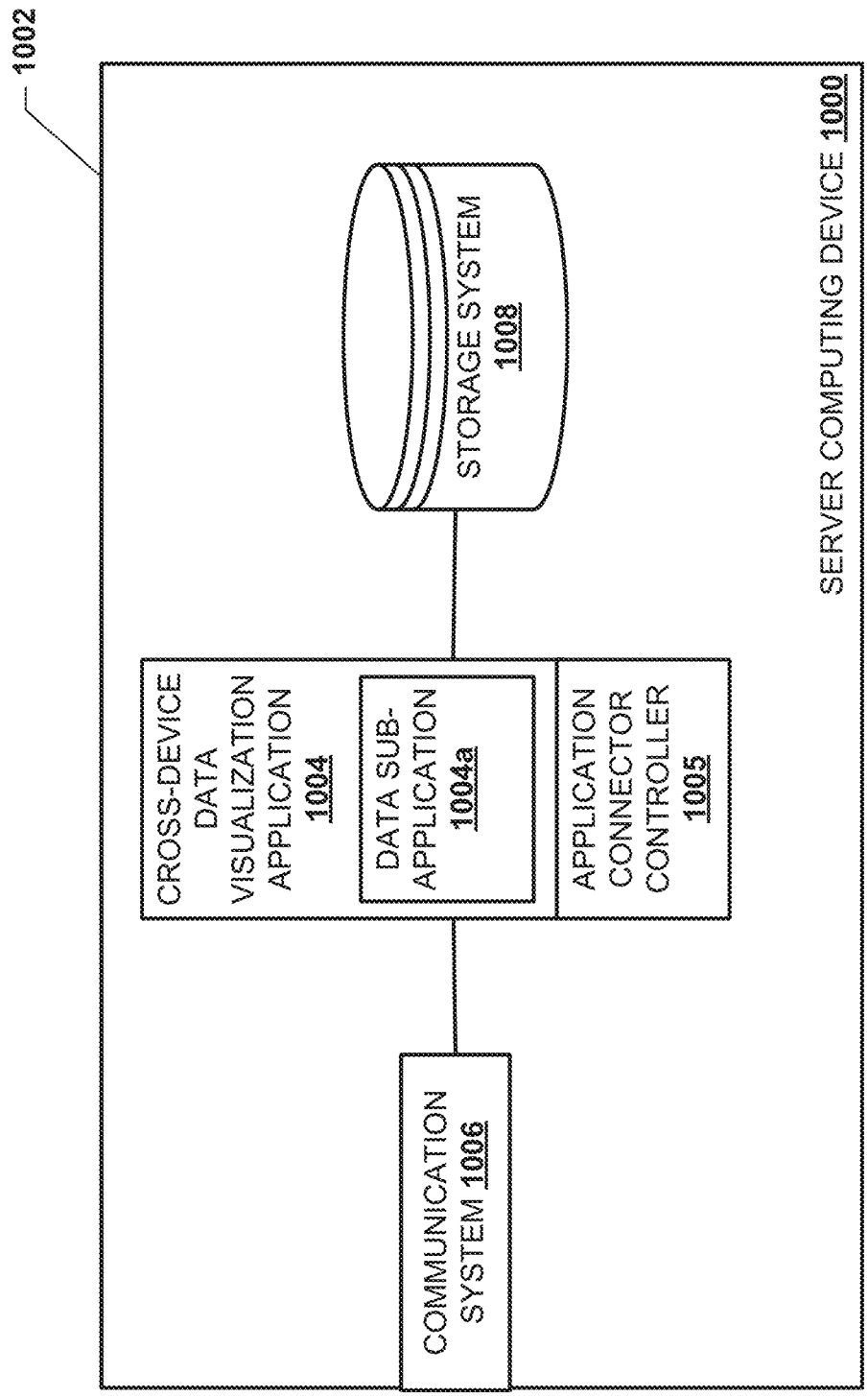
FIG. 10 is a schematic view illustrating an embodiment of a server computing device used in the cross-device data visualization system of FIG. 9, in accordance with some embodiments of the present disclosure.

Referring now to FIG. 10, an embodiment of a server computing device 1000 is illustrated that may be the server computing device 840 discussed above with reference to FIG. 8. In various embodiments, the server computing device 1000 includes one or more server. For example, the server computing device 1000 may provide the cross-device data visualization application 904 or the application connector controller 905 for the client computing device 900. In the illustrated embodiment, the server computing device 1000 includes a chassis 1002 that houses the components of the server computing device 1000, only some of which are illustrated in FIG. 10. For example, the chassis 1002 may house a processing system (not illustrated) and a non-transitory memory system (not illustrated) that includes instructions that, when executed by the processing system, cause the processing system to provide a cross-device data visualization application 1004 that is configured to perform the functions of the cross-device data visualization applications or the server computing devices discussed below. The cross-device data visualization application 1004 may include one or more data sub-applications 1004a (also referred to as data modules herein). The cross-device data visualization application 1004 and the data sub-applications 1004a may be distributed across the client computing devices 810 and 820 and the server computing device 840 of FIG. 8. The instruction may cause the processing system to further provide an application connector controller 1005 that is configured to perform the functions of the application connector controllers, or the server computing devices discussed below.

The chassis 1002 may further house a communication system 1006 that is coupled to the cross-device data visualization application 1004 or the application connector controller 1005 (e.g., via a coupling between the communication system 1006 and the processing system) and that is configured to provide for communication through the network 850 as detailed below. The communication system 1006 may allow the server computing device 840 to send and receive information over the network 850 of FIG. 8. The chassis 1002 may also house a storage device (not illustrated) that provides a storage system 1008 (e.g., the cross-device data visualization database 845 of FIG. 8) that is coupled to the cross-device data visualization application 1004 or the application connector controller 1005 through the processing system. The storage system 1008 may be configured to sensor data, a data set and its included one or more data structures, a data sub-application manifest, transformations, and/or any other instructions and/or information that would be apparent to one of skill in the art in possession of the present disclosure. While a specific server computing device 1000 has been illustrated and described, one of skill in the art in possession of the present disclosure will recognize that the teachings of the present disclosure will be beneficial for a variety of server computing devices that would be apparent to one of skill in the art in possession of the present disclosure and, as such, a wide variety of modifications to the number, types, and orientation of devices and modules in the server computing device 1000 will fall within the scope of the present disclosure as well.

Figure 11:
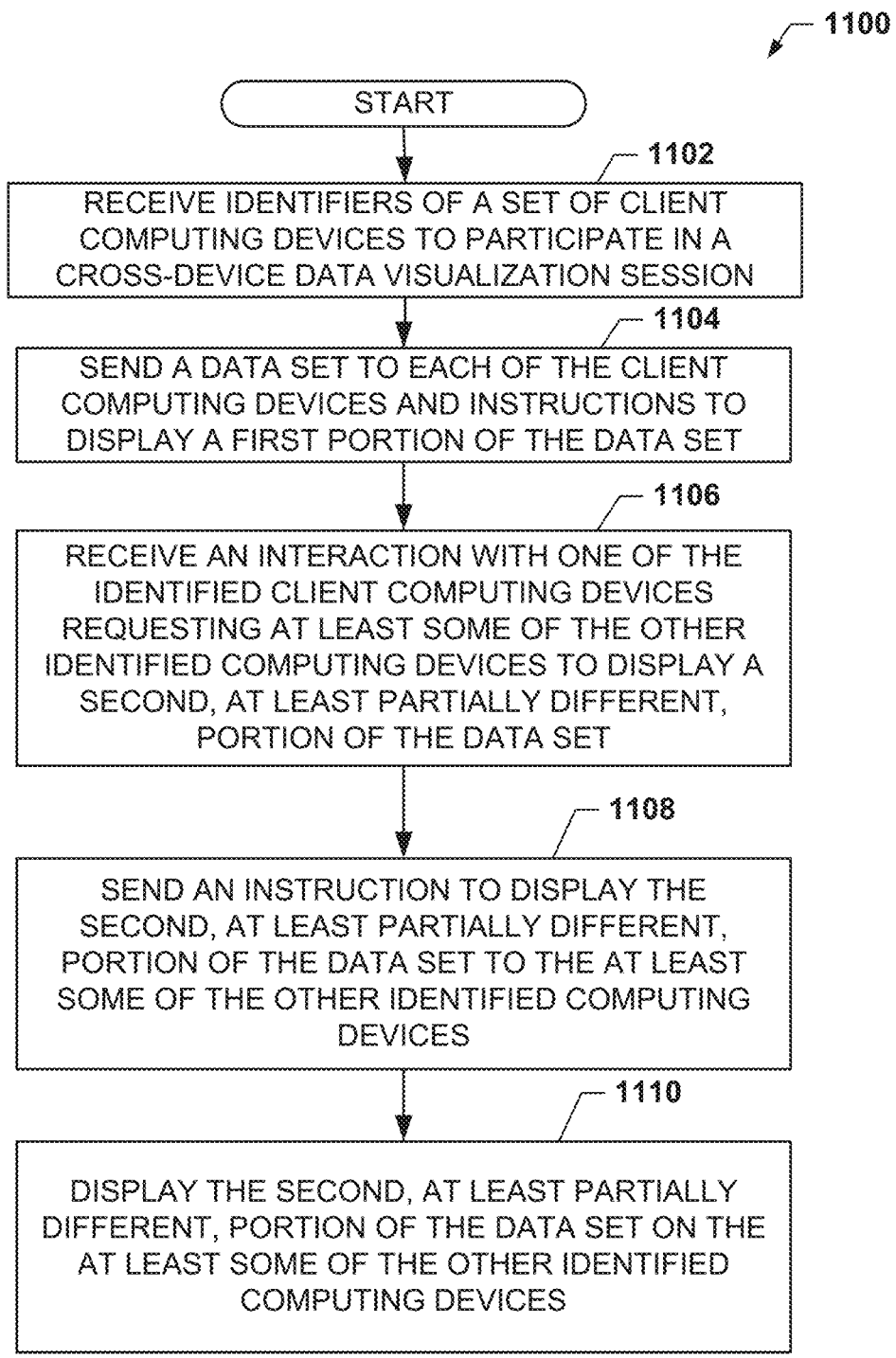
FIG. 11 is a flow chart illustrating an embodiment of a method of cross-device data visualization, in accordance with some embodiments of the present disclosure.

FIG. 11 depicts an embodiment of a method 1100 of cross-device visualization, which in some embodiments may be implemented with the components of FIGS. 8, 9, and 10 discussed above. As discussed below, some embodiments make technological improvements to content management, websites, cross-device visualizations, and other technology areas. The method 1100 is described as being performed by the cross-device data visualization application 1004 and the application connector controller 1005 on the server computing device 1000. Furthermore, it is contemplated that the cross-device data visualization application 904 and the application connector controller 905 on the client computing device 810 or 820 may include some or all the functionality of the cross-device data visualization application 1004 and the application connector controller 1005. As such, some or all of the steps of the method 1100 may be performed by the client computing device 810 or 820 and still fall under the scope of the present disclosure. As mentioned above, the server computing device 1000 may include one or more processors or one or more servers, and thus the method 1100 may be distributed across the those one or more processors or the one or more servers.

The method 1100 may begin at block 1102 where identifiers of a set of client computing devices to participate in a cross-device data visualization session are received. In an embodiment, at block 1102, each client computing device 810 or 820 may be provided to join a cross-device data visualization session. The client computing device 810 and 820, as well as other client computing devices, may form the cross-device data visualization session. For example, the client computing devices 810 or 820 may download from the server computing device 840, with a browser or special-purpose application, the application connector controller 905 and, in some embodiments, a manifest that lists data modules or one or more data sub-applications 904a to be executed at the respective device (which may be parsed and the corresponding data sub-applications 904a may then be retrieved). As discussed above, the data sub-application(s) 904a for a respective client computing device 810 or 820 may be installed to form the cross-device data visualization application 904/1004, which may span across a plurality of client computing devices 810 and up to 820 and the server computing device 840. In some cases, some data sub-applications 904a may ingest data, process the data, and present a view of the data (e.g., a graphical visualization) with various user inputs (and corresponding event handlers) with which users may interact.

In various embodiments, the client computing devices 810 and 820 may register their port and IP addresses or other identifiers with one another or with the server computing device 840 (e.g., in some cases, with a web of WebRTC data connections to facilitate relatively fast communication that do not need to pass through the server computing device 840, or in some cases, by routing the connections through the server computing device 840). In some embodiments, users in a cross-device data visualization session may have various roles (which may change over time in some cases), (e.g., a user in a designated role may input a command to their respective client computing device that adds other client computer devices to a cross-device visualization session and causes those other client computing devices to download one or more data sub-applications 904a to effectuate a device-specific data visualization. In some cases, such displays may be scripted in advance, e.g., for a presentation.

Some embodiments implement the application connector controller 905 in Javascript, but the application connector controller 905 may be programming language agnostic, and the set of rules can be deployed in any language. Similarly, data sub-applications 904a may be built with any programming language and installed in any type of computing device, including computers, servers, phones or any object with a chip, such as an Internet-of-things (IoT) appliance. As long as those data sub-applications 904a receive and deliver data in the form of the mentioned data types conforming the data grammar, any application connector controller 905/1005 may orchestrate any set of data sub-applications 904a/1004a in any computing device.

In an example, two application connector controllers 905 (that could be in different machines and deployed in different programming languages) can cooperate, co-forming a higher-level engine that operates following the same rules. In other words, the engine logics are additive, in some embodiments. An example configuration may have an engine on a client computing device 810 co-operating with an engine on a server computing device 840, orchestrating processes on the client computing devices 810 or 820 and on the server computing device 840.

In some embodiments, the client computing devices 810 and 820 may perform data sub-application negotiations to select one or more data sub-applications 904a for that client computing device 810 and 820 based on resources or select attributes of a client computing device for a given data sub-application 904a based on such factors. For example, the client computing devices 810 and 820 may have different displays that may be differently sized and the different client computing devices 810 and 820 may have different computing resources. As such, data sub-applications 904a that will operate best for a particular client computing device 810 or 820 may be selected by the applications connector module 905/1005 for each client computing device 810 or 820.

The method 1100 may then proceed to block 1104 where a data set is sent to each of the computing devices and instructions to display a first portion of the data set is also sent. In an embodiment at block 1104, the application connector controller 905 may provide a data set for the cross-device data visualization application 904 to each of the data sub-applications 904a running on the various client computing devices 810 and 820.

Some embodiments instantiate a data set with a series of data structures (e.g., each structure with its own format), along with a series of operations. For example, the data structures may independently store information of that data structure (e.g., numberList, dateList, point or polygon); each data structure may be transformed into many others (e.g., date can be converted into number, by counting milliseconds from a certain date, and thus, dateList can be transformed into numberList); some data structures may be joined to form another (e.g., multiple lists such as stringLists, dateLists, numberLists, can be assembled to form a table; and by further example points assemble to form a polygon); or other operations that operate on a data structure that would be apparent one of skill in the art in possession of the present disclosure. In some embodiments, the number of data structures may be small, around 25. This number comparable to the number of phonemes in many languages, including English, the number of characters in many alphabets, and the number of amino acids that form human proteins, and the comparison is not anecdotal since it seems to define an ideal number that balances simplicity and overwhelming combinatorial complexity.

Instructions to display at least a portion of the data set may be sent to each data sub-application 904a. In some embodiments, the portion may include one or more data structures of the plurality of data structures in the data set. In some embodiments, each data sub-application 904a may include instructions to display data from a data set. In some embodiments, the server computing device 840 may provide the instructions or the data set to the respective data sub-applications 904a in each client computing device 810 or 820 via the network 850. However, in some embodiments, the client computing device 810 may send the instructions or data set to the client computing device 820 via the communication channels 828a and 828b that may have been created when each client computing device 810 and 820 joined the cross-device data visualization session. For example, the communication channels 828a and 828b may be provided by WebSockets, other full-duplex communication protocols, or other secure connections. In other embodiments, the data set or the instructions may be provided via the local communication connection 830.

The instructions may cause the data sub-application 904a included on the client computing device 810 to display a first portion (e.g., one or more data structures or portions of one or more data structures) of the data set as a first data visualization. The instructions may cause the data sub-application 904a running on the client computing device 810 to display a second portion of the data set as a second data visualization. Other data sub-applications 904a included on the client computing devices 810 or 820 may display other portions of the data set as additional data visualizations such that the client computing devices 810 or 820 may display multiple data visualizations on the same display. In other words, a data visualization may be generated for the cross-device data visualization application 904 that is operating across the client computing devices 810 and 820 and each data sub-application 904a may operate to display a respective portion of the data visualization for the cross-device data visualization application 904 according to instructions for that data sub-application 904a.

The method 1100 may then proceed to block 1106 where an interaction is received with one of the identified computing devices requesting at least some of the other identified computing devices to display a second, at least partially different, portion of the data set. In an embodiment, at block 1106, an interaction may be received at one of the data sub-applications 904a that makes up the cross-device data visualization application 904. In various embodiments, the interaction may include a loaded external data by a data sub-application 904a (e.g., a loader module loading a csv and delivering a table); data captured from a sensor (e.g., a photovoltaic cell sending resistance changes through time, and delivering Number or NumberList to a data sub-application 904a); captured user inputs (e.g., a data sub-application 904a capturing a user input via user I/O system 922); periodically generated data (e.g., a data sub-application 904a that acts as a counter); a data sub-application 904a receiving data, processing the data, and delivering results; or any other interaction that would be apparent to one of skill in the art in possession of the present disclosure. The interaction with one data sub-application 904a may cause instructions for that data sub-application 904a to identify other data sub-applications 904a from the data sub-application manifest that requires propagation of the interaction.

The method 1100 may then proceed to block 1108 where an instruction is sent to display the second, at least partially different portion of the data set to the at least some of the other identified computing devices. In an embodiment, at block 1108, the application connector controller 905/1005 may provide an instruction to the various data sub-applications 904a on the client computing devices 810 and 820 to display at least a partially different portion of the data set, which may include an updated data set based on a data input. As discussed above, each data sub-application 904a, in some embodiments, receives the output of others and delivers output to others. Each data sub-application 904a, in some embodiments, has rules for obligatory and optional entrances of data (inlets), and optional outcomes of data. Each input and outcome, in some embodiments, may belong to a data structure from the grammar. In some embodiments, the data sub-applications 904a may be in series forming a directed graph. In some embodiments, the directed graph has no loops and data sub-applications 904a include only one output such that a data change does not perpetually cause the data sub-applications 904a to update the data set.

Some embodiments implement a data model that is expected to be more efficient than traditional techniques for connecting multiple data applications that have access to the same datasets. Instead of transferring big blocks of data, in some embodiments, the data sent and received by the client computing devices 810 or 820 describes a series of data processes to obtain the desired data set from the original ones. Thus, while multiple data modules may load and process synchronously the same data, embodiments of the present disclosure provide a protocol that may cause the data sub-applications 904a to communicate a transformation processes (such as filtering) in one data sub-application should be replicated across other data sub-applications that may run in different client computing devices or server computing devices. Some embodiments implement a protocol to communicate filtering and other data transformation information across different applications, based on a very light data format. This is expected to allow for fast synchronization on among the connected applications, in some implementations.

Instead of transferring big blocks of data, in some embodiments, the data sent and received by the application connector controller 905/1005 describes a series of data processes to obtain the desired data set from the original ones. The data sub-application 904a that receives from a user the transformation command quickly spreads the light information to the connected data sub-applications 904a. The user experience, in some embodiments, is then that the user is interacting upon the constellation of data sub-applications 904a, not on a single one.

The efficient transformation protocol, in some embodiments, may be accompanied by a series of server-side and client-side functionalities that, for instance, join multiple filtering and transformation objects, translate these objects to SQL and vice-versa. In some embodiments, each client computing devices 810 or 820 may hold in cache memory a data set that is independent of the data being visualized (e.g., it may be larger than the data currently depicted by the respective device, and the depicted data may be a subset of what is in the cache). A data sub-application 904a may receive a filter (or message indication some other transformation), determine that that indicated transformation can be performed on the data resident in cache memory, and perform that transformation, in some cases, without incurring a delay by requesting new or different data. In some cases, a transformation may implicate more data than is resident in cache memory, and some embodiments may display a subset of the data, request the remaining data from another data sub-application 904a or the cross-device data visualization database 845, and update a display as it is received. In some embodiments, a client computing device of a user leading a presentation may specify data for the other client computing devices in a cross-device data visualization session to hold in cache memory. As users interact with the data visualizations, it is expected that data visualizations may be relatively quickly updated based on the cache data.

In some browser-based implementations, user devices may constrain the amount of memory available for a given domain (e.g., local Storage is often limited to 5-to-10 MB per domain for security purposes, to prevent untrusted websites from impairing device performance). In some embodiments, additional memory of the client computing device 810 or 820 may be accessed via the IndexedDB API, which in some cases, may also cause the client computing devices 810 or 820 to index the data to afford relatively fast queries. In some embodiments, data may be maintained at rest in encrypted format on the client devices (and sent in encrypted format), e.g., with the WebCrypto API in some browser-based implementations.

In some embodiments, client computing devices 810 or 820 may store cache data both in a localStorage object and native cache memory of the browser in order to have more room for larger data sets. In some cases, localStorage objects are substantially faster to access (e.g., with less than ⅓ the latency) than native browser cache. As such, in some embodiments, the application connector controller 905 may arrange data between these two forms of client-side storage to position data more likely to be accessed in the localStorage object (e.g., data adjacent that currently displayed in a data visualization, either in spatial dimensions of the display to accommodate zooming or panning, or adjacent in a graph to accommodate pivots).

In various embodiments, the data sub-applications 904a may include a first website or application accessible at a first domain and a second website or application accessible at a second domain. As such, embodiments of method 1500 of FIG. 15 may be incorporated into method 1100 such that multiple websites or applications that share the same data sub-application window may exchange data according to method 1500 and share data between data sub-applications 904a hosted on various client computing devices 810 or 820.

The method 1100 may then proceed to block 1110 where the second, at least partially different, portion of the data set is displayed at the at least some of the other identified computing devices. In an embodiment, at block 1110, the one or more data sub-applications 904a that received the instruction to display the second, at least partially different, portion of the data display the second portion of the data set on a display included in the display system 924 included on the client computing device 810 or 820. For example, the display of the client computing device 810 may have displayed a first portion of the data set according to a first data sub-application 904a and the display of the client computing device 820 may have displayed a second portion of the data set according to the second data sub-application 904a. During the method 1100, the user of the client computing device 810 may provide an input to the data visualization on the display of the computing device 810 provided by the first data sub-application, which may cause an instruction to be generated and provided to the second data sub-application 904a on the client computing device 820 to display a third portion of the data set, which, in some embodiments, may include a transformation of the second portion of the data set to the third portion of the data set. As a result, the client computing device 810 may provide an updated data visualization based on the input and the client computing device 810 may provide an updated data visualization based on the third portion of the data set. As such, the client computing devices 810 and 820 may display different aspects of data visualization that spans multiple computing devices.

As described above, FIG. 1 illustrates another example of the cross-device data visualization, in which four different display screens display three different views on a data set. Interactions with one of these displays, e.g., to select a given data point or cluster icon, may cause the other displays to automatically update to display a responsive view on the data.

Thus, systems and methods of the present disclosure provide for cross-device data visualization. By implementing a modular architecture and a transformation protocol, latency in cross-device data visualizations may be reduced. As such, user experiences may be enhanced, and large data sets may be used in cross-device data visualizations. These and other technical improvements may be apparent to one of skill in the art in possession of the present disclosure.

2. Application Layer Protocols

Some embodiments implement a connection protocol that allows data transfer communication among websites, and thus, has the potential to open a new network of websites within the world-wide web, with websites interchanging information and opening new and powerful capabilities. Embodiments include computing devices and code (affixed to a tangible, non-transitory, machine-readable medium) configured to process the protocol, comply with the protocol, and provide the affordances discussed below.

In some embodiments, the connection protocol is based on already existing commands and standards to communicate a website with another that is embedded.

In some embodiments, the protocol based on a series of data formats (lists, tables, networks, etc.) that will ease and make useful the sharing of data. Websites that have WWW connection protocol capabilities are called Data Connected Websites (DCW).

In some embodiments, any website that is a data application (dashboard, visualization or data analysis) can be used as a module/sub-application to build another data application that can contain it. If multiple DCWs deliver and receive the same data format, they can be used together in a new, higher level, DCW, in some cases. There is no limit for the number of levels (DCWs within DCWs interminably), in some implementations.

DCWs have the capabilities of normal websites, but additionally, they are prepared to be activated differently if data is sent to them. DCWs in some embodiments include a function that provides an interface by which the DCW is called. In some embodiments, the logic (or a portion thereof) of a DCW may be provided by a browser extension previously installed. In some cases, the websites may be sent with both markup (e.g., HTML) and scripts (e.g., JavaScript™). In some embodiments, the scripts (or a browser, or browser plugin) may include an event handler that is called by the browser upon one of the following events. In some cases, the various event handlers may be executed asynchronously from other aspects of the website.

onDataReceived

In some embodiments, an onDataRecieved event occurs, and a functional of that name is called, when data is received within the protocol described, e.g., when initializing a display or updating a display. Whenever this function is called with properly formatted data, the website may use the data to execute new outcomes (e.g., update/create a DOM, virtual DOM, or element thereof, such as a canvas element).

In some embodiments, the website could contain a function as follows.

sendDataToParent

A sendDataToParent function, may return data to a parent (e.g., linked-to) webpage, so communication could be bi-directional.

Adding the data connection protocol may be implemented with existing html standards, such as with web Sockets and WebRTC data connections.

In some embodiments, a community of developers and designers may start developing DCWs, these will be combinable, creating synergies and building a rich network of websites that can be combined in virtually infinite ways.

Typically, data websites, such as dashboards, or visualizations, are dead ends: they receive data, display some outcomes, but do not deliver data. Also, conventionally, a data website receives one single dataset, or multiple possible datasets via APIs, but never expect data coming externally. With this new protocol, websites will be connected in a radical new way, creating rich flows of information, allowing for unexpected combinations.

In some embodiments, two or more DCWs are embedded into iFrames within a website called the parent website. The parent website can then communicate with each DCW, sending and receiving data. It can then take data from one DCW and send it to another DCW, etc. creating flows of data among all the DCWs.

In some cases, browsers prevent client-side exchanges of information between domains for security purposes due to a same-origin policy. Some embodiments may affect communication by message passing via servers. Or some embodiments may achieve lower-latency client-side communication through postMessage messaging (e.g., without sending the message outside of the client device). In some embodiments, code from one domain may message another domain with a message including the content of the domain and a targetDomain. Some embodiments may include event handlers in code sent from each domain configured to receive message events and processing the messages.

When different developers create different DCWs that process, analyze and visualize data in multiple different ways, it will be possible to create entire rich data applications, websites that combine the power of individual developments. Websites will be created in a way they are also open to data to come and be delivered.

Figure 3:
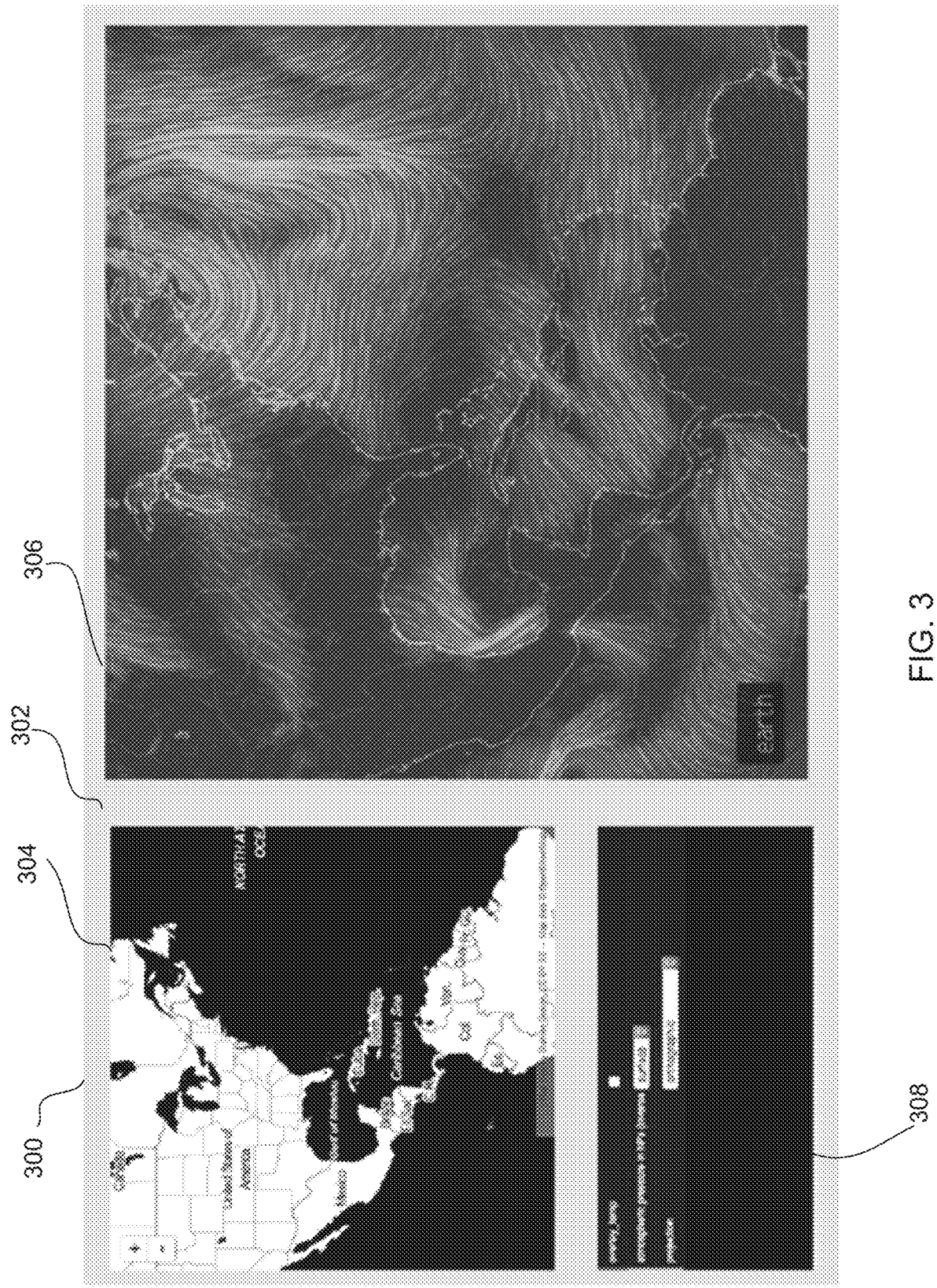
FIG. 3 illustrates an example use case with multiple interacting websites operating with a connection protocol.

By example, the image of FIG. 3 shows a website called Earth, that visualizes wind currents, and that contains the connection protocol, being connected to another website that displays a map. By interacting in the map (zooming, dragging) a geographic region is defined and sent to the Earth website, that will use these new coordinates to display the desired location. A third simple website contains some simple html text area fields and selectors, to allow the user to define some parameters that are also sent to Earth and modify its outcome. The three websites are located in different servers.

Some embodiments implement a process that is extremely useful as a first step when starting analysis of a dataset. Some embodiments include a meta analytical process that provides perspective and insight for subsequent analysis. Some embodiments remain agnostic to subsequent forms of analysis by only analysis at the structure of the data and not its contents. This approach is expected to work well even if the data has categorical variables, numerical variables or a combination of both. It also is expected to work well with numeric and categorical variables with holes (null values).

In some embodiments, the result of this process is a network that indicates:
hierarchical relations among variables, absolute or graded, when they exist;
hierarchical sequences of variables; an obvious example will be continent, country, region, city, zip code, etc., the method reveals these kind of sequences, and also nonobvious sequences of hierarchies;
to what extent a variable is a good predictor of any other variable (how much knowing the value of a variable increases the probability of knowing the value of another). In absolute or strong hierarchical cases this relation is absolutely or strongly unidirectional: knowing the value of one variable indicates the value in the other one.

As an example, in a table with city and zip as variables, knowing the zip value determines the city value. The opposite is not necessarily true. More mildly, in a table of cancer patients, knowing the type of cancer is in general a good indicator of gender (since many cancer types are associated with exclusively male or female tissues and organs); and knowing the gender also improves the probability of guessing the type of cancer, but to a lower extent. Finally, if two variables are strongly correlated, the relations are strong and bidirectional.

This predictability network is extremely useful and believed to provide fast insight to data stake holders. Typically, analysis starts by analyzing individual variables, and then certain combinations of variables. But what combinations are meaningful, seems to be something decided a priori, from preconceptions. This way, meaningful relations (including positive and negative correlations) are lost, as well as worth to analyze combinations. Colinearity can come in groups of three or more variables, and the combinatoric space is immense (at least above certain small number or variables: for n variables the combinations are (n+1)!, thus 10 variables produce around 40 million possible variables subsets). The network, when visualized, in some embodiments, provides an instant wholistic perspective on the data, with clusters that indicate colinearity groups.

This network could be visualized and provide, at a glance, a very good structure of the dataset. It also points to meaningful extractions and rearrangements of the data. For example, when a hierarchical sequence is found, it can produce a tree (later visualized as a Treemap).

A variety of approaches may be used to determine how much a variable is predictable. In some cases, a variable is very predictable if it has many variables that strongly predict it. But if those variables are themselves predictables, it adds up for the initial variable predictability. And etcetera. For this reason, the nodes in this network may be weighed using the pageRank metric described Brin, S.; Page, L. (1998). "The anatomy of a large-scale hypertextual Web search engine" (PDF). Computer Networks and ISDN Systems. 30: 107-117. doi:10.1016/S0169-7552(98)00110-X. ISSN 0169-7552. A variable is deemed predictable (has high weight) when is predicted by variables that are predictable (have high weight). Some embodiments may generate visualization by which one can see immediately which are the 'predators in the food network' of predictability, and the variables that are intractable. Another way to see this is that highly predictable variables contain redundant information already present (at least in big part) in the other variables, these variables can be labeled as central; inversely, variables with low predictability are affected by external factors, they bring information from aspects not present in the dataset, they could be called peripheral.

In some embodiments implementing the infoGain construction, categorical variables can be compared with numeric ones. In some cases, there is a segmentation process on the numeric variables, typically by calculating quantiles or equally spaced intervals (other methods are possible). As an example, in the cancer table, if ages are segmented this way: 0-20, 21-40, 41-60, and so on, cancer type could have strong correlation with ages, since certain cancer types have higher incidence in certain age segments (e.g., lymphoblastic leukemia in 0-20, prostate cancer in 61-80). Once broad correlations are detected on numeric variables treated as categories, it is possible to refine with different segmentations, or jump to different types of analysis that do not require segmentation.

Finally, the information gain network is based on the information gain metric, typically used in decision trees, that is itself based in the calculation of entropy of categorical variables. The Information Gain Network Analysis is highly influenced by his Information Theory and general thinking.

To these ends, some embodiments may execute the following process:
1. convert all numeric dimensions categorically, by segmenting them (e.g., a safe initial step, recommended as default, could be finding the 10 deciles for each numeric variable);
2. calculate entropy for all variables;
3. calculate for each pair of variables A,B the two information gain values ig(A,B) and ig(B,A), that indicate how much entropy decreases when one split one variable using the values of the other;
4. for each information gain value, above a certain predefined threshold, create a directed relation;
5. calculate the pageRank weight for each node, e.g., by forming an adjacency matrix of the parameters and degerming an eigenvector based on the adjacency matrix. Other embodiments may use other centrality measures for network analysis, such as degree centrality, closeness centrality, betweenness centrality, subgraph centrality and Katz centrality.

Figure 4:
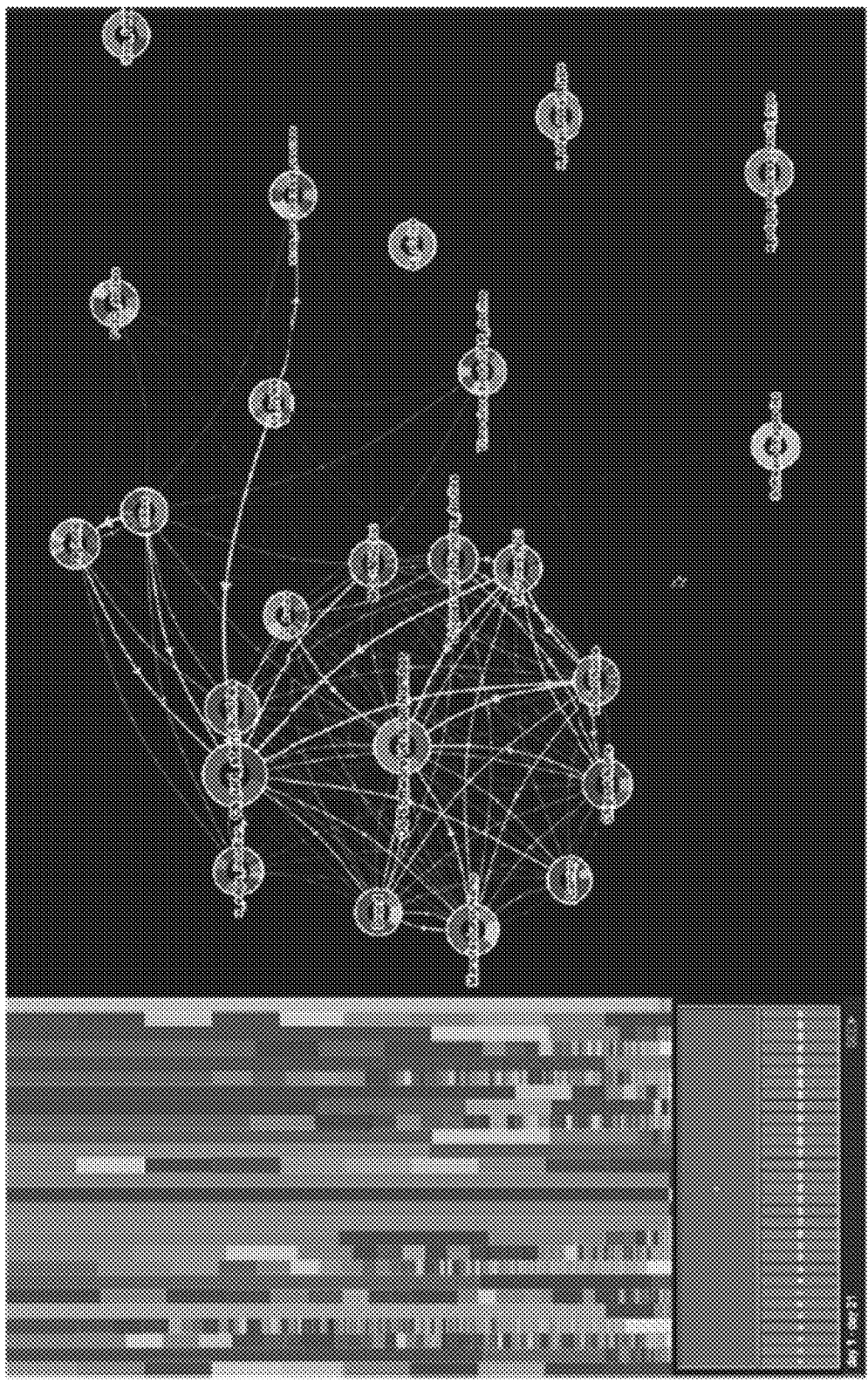
FIG. 4 illustrates an example use case of a session displaying the interrelationship of data as a network of interconnected nodes.

With these steps, some embodiments may generate a visualization like that shown in FIG. 4. As shown, visualizing the network provides holistic insight about the data.

In some embodiments, an interactive visualization for the information network displays each node with area proportional to its weight, colors representing different values, and connecting lines with thickness proportional to information gain value. Some embodiments may receive a selection of two nodes and respond by finding and displaying the shortest paths (e.g., ranked by distance).

Figure 12:
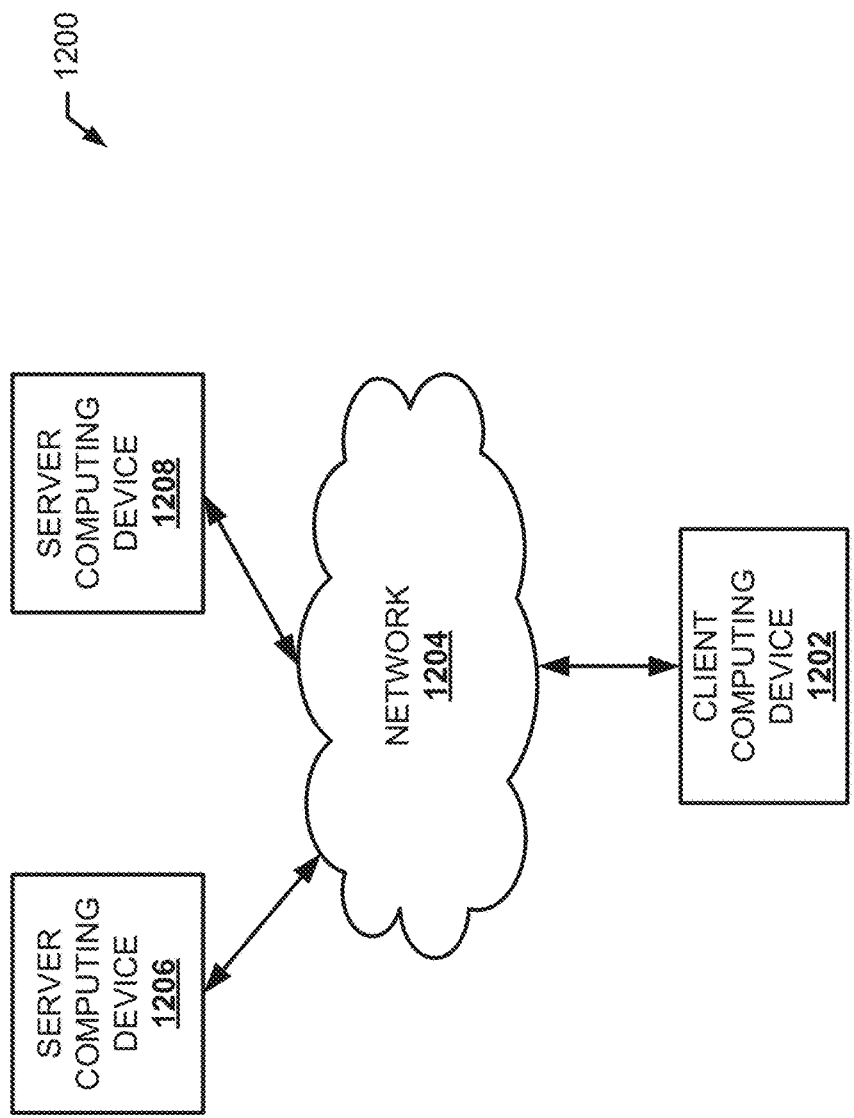
FIG. 12 is a schematic view illustrating an embodiment of an application data exchange system, in accordance with some embodiments of the present disclosure.

FIG. 12 illustrates an embodiment of an application data exchange system 1200 according to various embodiments. In an embodiment, the application data exchange system 1200 may include a client computing device 1202 coupled to a network 1204. Furthermore, the application data exchange system 1200 may include one or more server computing devices (e.g., a server computing device 1206 and a server computing device 1208) coupled to the network 1204. In a specific example, the server computing device 1206 or the server computing device 1208 may host one or more websites or applications, the client computing device 1202 may be configured send or receive data between websites that are displayed on a web browser or other application running on the client computing device 1202. While a specific example of the application data exchange system 1200 is illustrated, one of skill in the art in possession of the present disclosure will recognize that a wide variety of application data exchange systems having various configurations of networks, user devices, and service provider devices that may operate to provide the systems and methods discussed herein without departing from the scope of the present disclosure.

Figure 13:
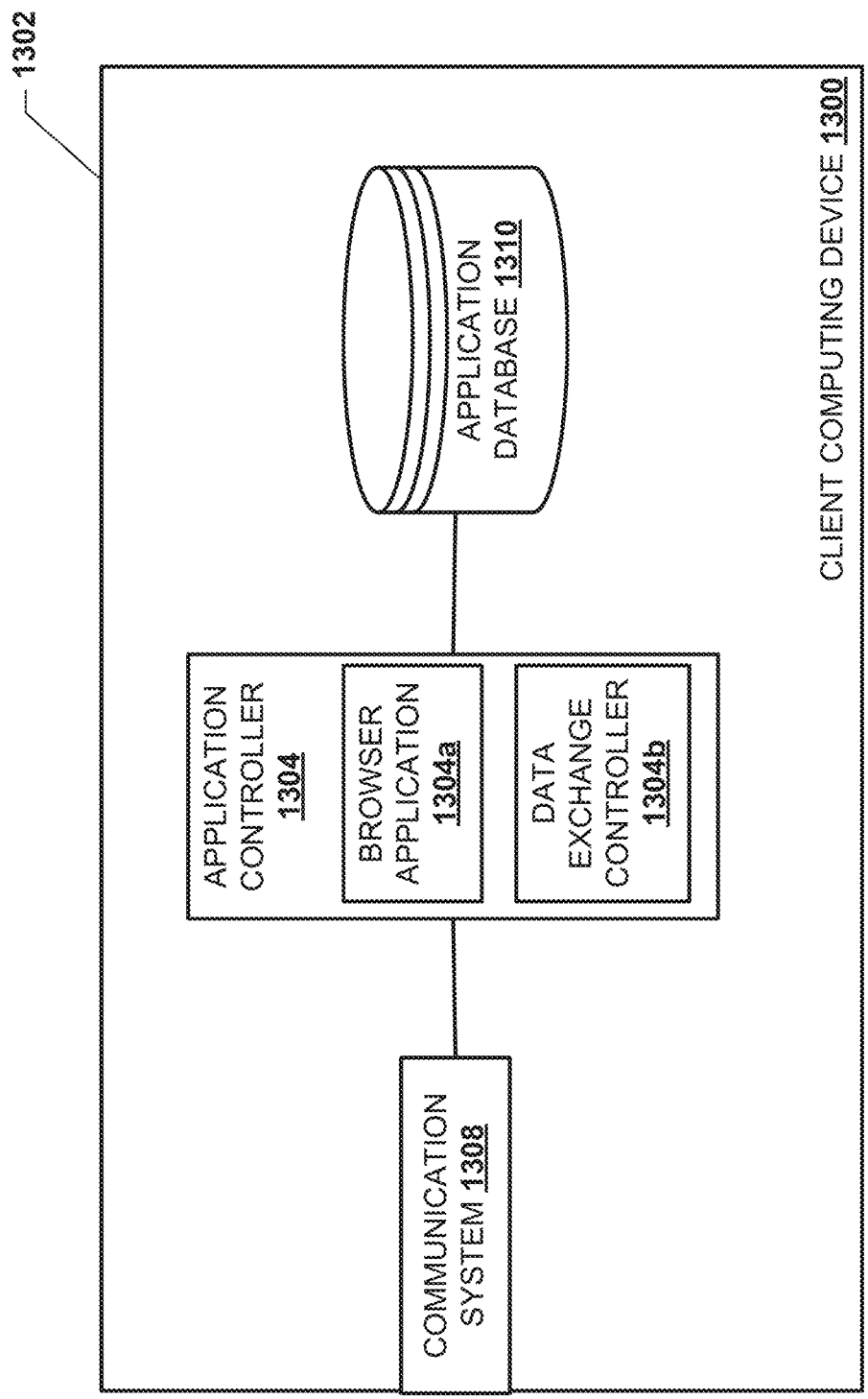
FIG. 13 is a schematic view illustrating an embodiment of a client computing device used in the application data exchange system of FIG. 12, in accordance with some embodiments of the present disclosure.

FIG. 13 illustrates an embodiment of a client computing device 1300 that may be the client computing device 1202 discussed above with reference to FIG. 12, and which may be provided by a desktop computing system, a laptop/notebook computing system, a tablet computing system, a mobile phone, a wearable device, or other client computing device that would be apparent to one of skill in the art in possession of the present disclosure. However, one of skill in the art in possession of the present disclosure will recognize that the client computing device 1300 may be provided by any of a variety of computing devices in the different examples discussed below. In the illustrated embodiment, the client computing device 1300 includes a chassis 1302 that houses the components of the client computing device 1300, only some of which are illustrated in FIG. 13. For example, the chassis 1302 may house a processing system (not illustrated) and a non-transitory memory system (not illustrated) that includes instructions that, when executed by the processing system, cause the processing system to provide an application controller 1304 that is configured to perform the functions of the application controllers and client computing devices discussed below. In a specific example, the application controller 1304 is configured to provide a browser application 1304a and a data exchange controller 1304b, discussed below, although one of skill in the art in possession of the present disclosure will recognize that other applications and computing device functionality may be enabled by the application controller 1304 as well.

The chassis 1302 may further house a communication system 1308 that is coupled to the application controller 1304 (e.g., via a coupling between the communication system 1308 and the processing system). The communication system 1308 may include software or instructions that are stored on a computer-readable medium and that allow the client computing device 1300 to send and receive information over the network 1204. The chassis 1302 may also house a storage system that includes an application database 1310 that is coupled to the application controller 1304 (e.g., via a coupling between the storage system and the processing system). The application database 1310 may store a website, an application, data utilized in a website or application or other information or instructions. While the application database 1310 has been illustrated as housed in the chassis 1302 of the client computing device 1300, one of skill in the art will recognize that the application database 1310 may be connected to the application controller 1304 through the network 1204 without departing from the scope of the present disclosure. While a specific client computing device 1300 has been illustrated, one of skill in the art in possession of the present disclosure will recognize that client computing devices (or other devices operating according to the teachings of the present disclosure in a manner similar to that described below for the client computing device 1300) may include a variety of components and/or component configurations for providing conventional computing device functionality, as well as the functionality discussed below, while remaining within the scope of the present disclosure as well.

Figure 14:
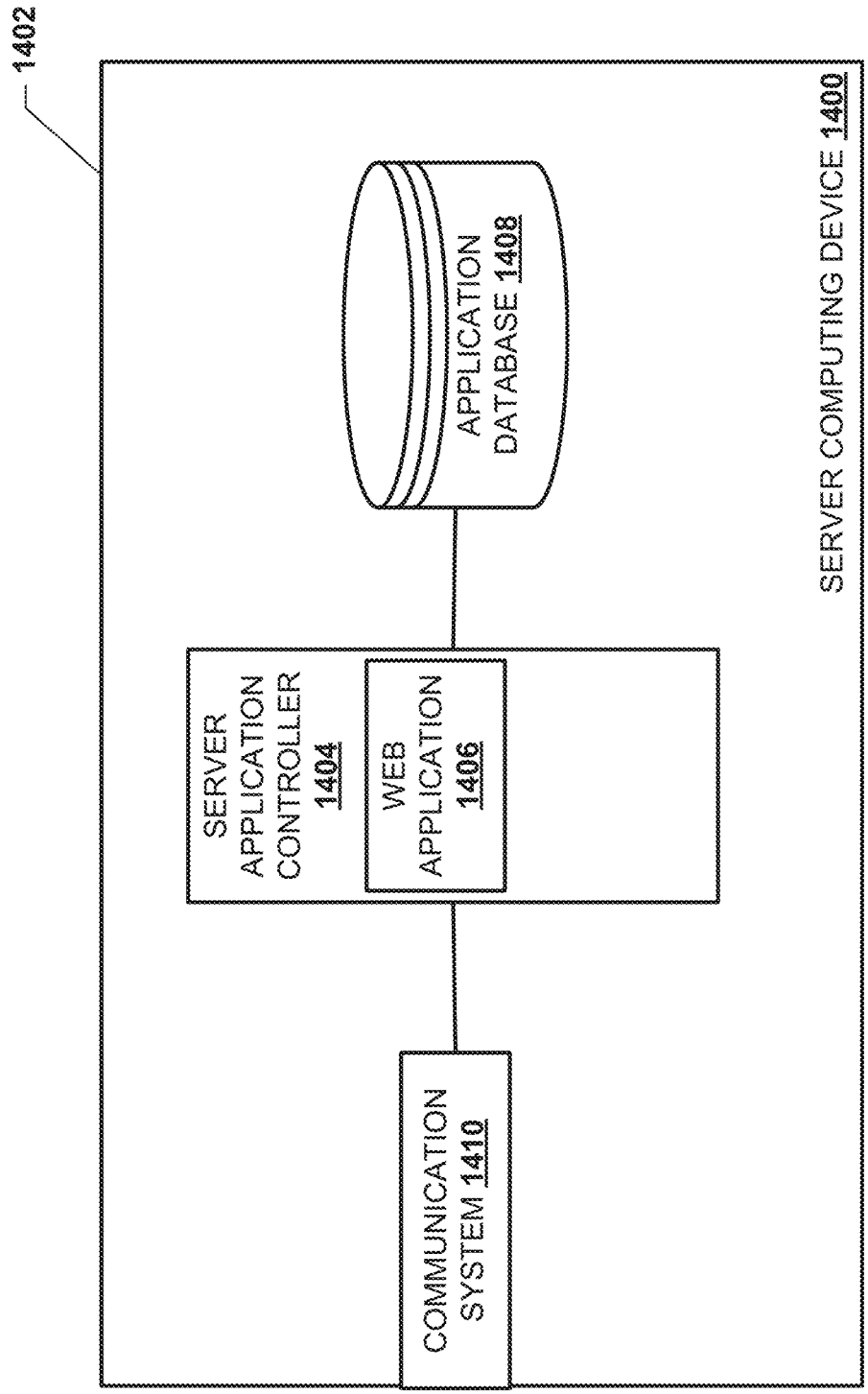
FIG. 14 is a schematic view illustrating an embodiment of a server computing device used in the application data exchange system of FIG. 12, in accordance with some embodiments of the present disclosure.

FIG. 14 illustrates an embodiment of a server computing device 1400 that may be the server computing device 1206 or 1208 discussed above with reference to FIG. 12, and which may be provided by one or more server devices. In the illustrated embodiment, the server computing device 1400 includes a chassis 1402 that houses the components of the server computing device 1400, only some of which are illustrated in FIG. 14. For example, the chassis 1402 may house a processing system (not illustrated) and a non-transitory memory system (not illustrated) that includes instructions that, when executed by the processing system, cause the processing system to provide a server application controller 1404 that is configured to perform the functions of the application controllers and service provider devices discussed below. In a specific example, the server application controller 1404 is configured to provide a web application 1406 (e.g., an application for a native application or an application for a browser application) discussed below, although one of skill in the art in possession of the present disclosure will recognize that other applications and computing device functionality may be enabled by the server application controller 1404 as well.

The chassis 1402 may further house a communication system 1408 that is coupled to the server application controller 1404 (e.g., via a coupling between the communication system 1408 and the processing system) and that is configured to provide for communication through the network 1204 as detailed below. The chassis 1402 may also house a storage system that includes an application database 1410 that is coupled to the server application controller 1404 (e.g., via a coupling between the storage system and the processing system). The application database 1410 may store web pages, images, videos, audio, other content, user profiles, user identifiers, user permissions, and/or other data used by the server application controller 1404 to provide services and perform the application data exchange functionality discussed below. While the application database 1410 has been illustrated as housed in the chassis 1402 of the server computing device 1400, one of skill in the art will recognize that the application database 1410 may be connected to the server application controller 1404 through the network 1204 without departing from the scope of the present disclosure. While a specific server computing device 1400 has been illustrated, one of skill in the art in possession of the present disclosure will recognize that server devices (or other devices operating according to the teachings of the present disclosure in a manner similar to that described below for the server computing device 1400) may include a variety of components and/or component configurations for providing conventional computing device functionality, as well as the functionality discussed below, while remaining within the scope of the present disclosure as well.

Figure 15:
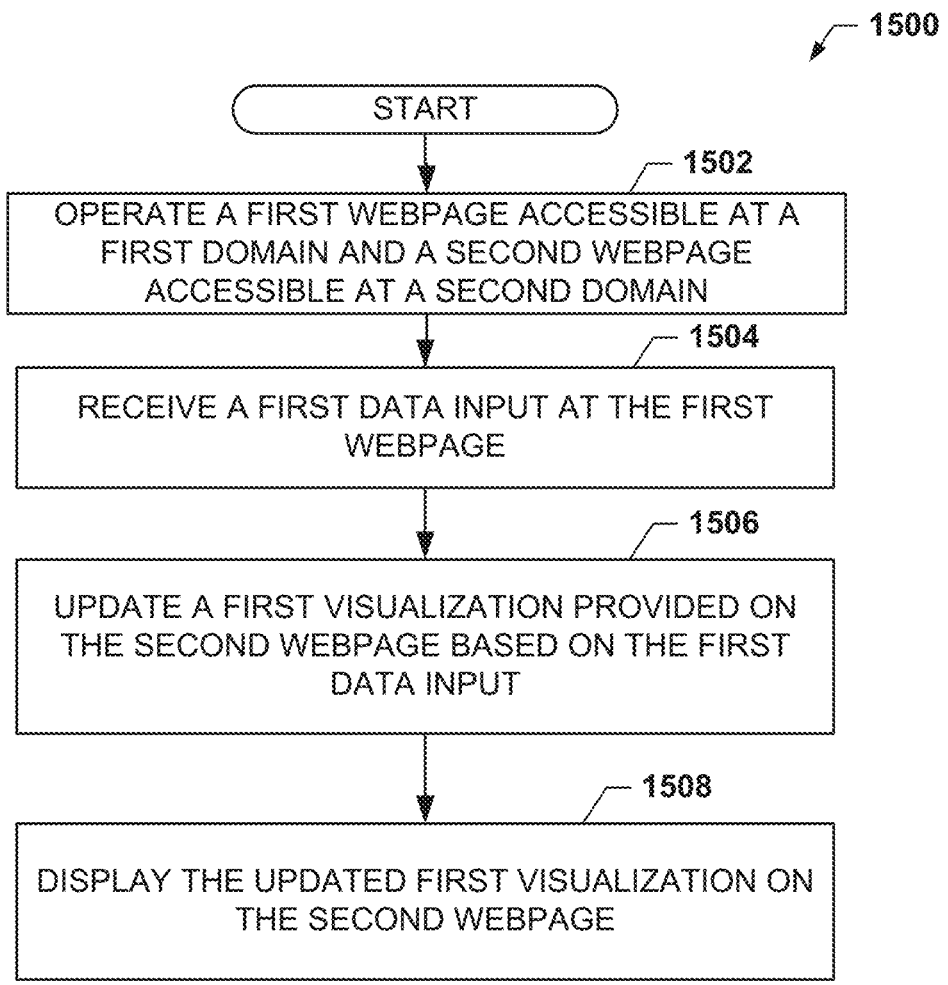
FIG. 15 is a flow chart illustrating an embodiment of a method of application data exchange, in accordance with some embodiments of the present disclosure.

FIG. 15 depicts an embodiment of a method 1500 of data exchange between websites, which in some embodiments may be implemented with the components of FIGS. 12, 13, and 14 discussed above. As discussed below, some embodiments make technological improvements to content management, websites, native applications, and other technology areas. The method 1500 is described as being performed by the application controller 1304 on the client computing device 1202/1300. Furthermore, it is contemplated that the server application controller 1404 on the server computing devices 1206 or 1208 may include some or all the functionality of the application controller 1304. As such, some or all of the steps of the method 1500 may be performed by the server computing device 1206 or 1208/1400 and still fall under the scope of the present disclosure. As mentioned above, the server computing device 1400 may include one or more processors or one or more servers, and thus the method 1500 may be distributed across the those one or more processors or the one or more servers.

The method 1500 may begin at block 1502 where a client computing device is operating a first webpage accessible at a first domain and a second webpage accessible at a second domain. In an embodiment, at block 1502, the browser application 1304a on the client computing device 1202/1300 may be running a first webpage that is accessible at a first domain and a second webpage that is accessible at a second domain. For example, one webpage may be accessible at "www.service1.com" while the other webpage may be accessible at "www.service2.com." However, in other embodiments, any application (e.g., a native application) provided by the application controller 1304 may run the webpages or other application views that are accessible via different domains.

In some embodiments, the first webpage and the second webpage may be included in the same window of the browser application 1304a. For example, the second webpage may be embedded in the first webpage. The embedding of the second webpage into the first webpage may be accomplished using HyperText Markup Language (HTML) iframes. In some embodiments, the first webpage may embed the second webpage and a third webpage. In yet other embodiments, the first webpage may embed the second webpage that embeds the third webpage. While embedded webpages are discussed, in other embodiments, it is contemplated that the first webpage and the second webpage may be open in different windows or tabs of the browser application 1304a. Further still, one of skill in the art in possession of the present disclosure, will recognize that various combinations of embedding than described above with fewer or more webpages may be contemplated.

The webpages may include conventional webpage functionality, but additionally, the webpages may be prepared to be activated differently if data is sent to them. In some embodiments, the webpages include a function that provides an interface by which the webpage is called. In some embodiments, the logic (or a portion thereof) of a webpage may be provided by a browser extension previously installed (e.g., the data exchange controller 1304b). In some cases, the webpages may be sent with both markup (e.g., HTML) and scripts (e.g., JavaScript™). In some embodiments, the scripts (or a browser, or browser plugin) may include the data exchange controller 1304b (e.g., an event handler) that is called by the browser application 1304a. In some cases, the various event handlers may be executed asynchronously from other aspects of the webpage. In various embodiments, the function that provides the interface by which the webpage is called may include a receive function (e.g., "onDataReceived") or a send function (e.g., "sendDataToParent").

For example, onDataReceived is a function that data webpages of the present disclosure may have because it is through this function that data will arrive. The data webpage may operate (display information, allow interaction) even before receiving data through onDataReceived but in general the webpage may be active once this function is called from an external source (another data webpage, or the wedge that embeds it). The types of objects onDataReceived can receive depends on the architecture of the data webpage. For example, a configuration may include an object with two properties: type and value. The property type may include a short string and indicates what kind of data is arriving to the webpage, common cases are: "configuration", "data", "select". If the type is "configuration," the value may be an object that contains configuration information, (e.g., color background, or what kind of model or visualization the webpage will use, etc.). If type is "data," the value may include the data to be analyzed or visualized. If the type is "select", the value may be to indicate the webpage that it will perform an action, for example, selecting an item, whose ID would be indicated in the value. The examples above indicate that onDataReceived is used to pass data to a data webpage, define its configuration (aspect, behavior . . . ), or externally control its behavior. onDataReceived could be called only once (for instance to send the data), or as many times is required, for instance to pass different data in different moments (including a constant stream of data), or change the data webpage configuration, or control it.

The send function, sendDataToParent, may provide a function that is injected into the data webpage by the embedder, so it can be used to send information. Equivalent to onDataReceived, a good practice for sending information is sending an object with properties type and value. The data webpage may send data such as an analysis performed by it, or a subset of the data received defined by the user interaction, in these cases the types could be "result" or "filter". A data webpage may also report actions performed by the user, such as selecting an item (type "select", value is id of item).

The following describes two example cases of communication between two data webpages. In a first example, a user selected an item in Data Webpage A, and through sendDataToParent reports this action (type:"select", value: itemID). The embedder receives this information, and sends it to onDataReceived in Data Webpage B. Data Webpage B understands that it needs to select an element with id itemID. As such two or more modules are in synch, and when a user selects an element in one data webpage, the user actually does it in all.

In the second example, a user may perform a filter or sub-selection of data in Data Webpage A, and sends that data using sendDataToParent (with type "data" and value the filtered dataset), this information is then sent to Data Webpage B, where the data may be used to visualize or analyze the subset of data. In this way, a webpage is used as a filterer and the other as visualization. Note that many other webpages may receive the filtered information. Also, many filter webpages may be combined to define subsets of data in more complex ways (for instance one webpage defines a geographic region, another a time interval, and another some values intervals in a scatter plot).

The method 1500 may then proceed to block 1504 where a data input is received at the first webpage. In an embodiment, at block 1504, the first webpage may receive a data input. For example, a user may enter a value into a field, the user may manipulate an application view (e.g., zoom in or move a map), the user may make a selection from possible data values presented on the first webpage, an IoT device may update environmental data displayed by a webpage, or other data inputs that would be apparent to one of skill in the art in possession of the present disclosure.

The method 1500 may then proceed to block 1506 where a visualization provided on the second webpage is updated based on the data input to the first webpage. In an embodiment, at block 1506, the data exchange controller 1304*b* may use the data input received at the first webpage and update a second webpage based on that data input. The data exchange controller 1304*b* may execute an event handler that may be executed asynchronously from other aspects of the webpage. The event handler may provide the data received at the first webpage to the second webpage. The second webpage may update according to the data received. In some embodiments, the second webpage may include an "onDataReceived" function. In some embodiments, an onDataRecieved event occurs, and a function of that name is called, when data is received within the protocol described, e.g., when initializing a display or updating a display. Whenever this function is called with properly formatted data, the second webpage may use the data to execute new outcomes.

In some embodiments, the website could include a sendDataToParent function or other send function. A sendDataToParent function, may return data to a parent (e.g., linked-to) webpage, so communication could be bi-directional. Adding the data connection protocol may be implemented with existing html standards, such as with webSockets and WebRTC data connections. In various embodiments, the data input received may be processed via circumvention of a same-origin policy of the browser application 1304*a* on which the first webpage and the second webpage are operating. As such, the updating the first visualization provided on the second webpage based on the first data input may be performed without sending the update outside of a client computing device operating the browser application 1304*a* for the first website and the second website.

In principle the server computing device 1206 or the server computing device 1208 delivers the data webpages to the client computing device. For example, the embedder and the webpages could be provided by the server computing device 1206 or the server computing device 1208) and then the data webpages communicate and send information one to each other, all on the client computing device 1300. No information may be received or sent from any server.

However, one of the data webpages may communicate with the server computing device 1206 or the server computing device 1208 to receive or send information. For instance, data wedges may be built to gather combined information about markets and currencies in real time, and then send this info through sendDataToParent. This info will be sent to other webpages. In another example, one of the data webpages is a controller of a server computing device service provided by the web application 1406. For instance, web application 1406 hosted on the server computing device 1400 could run a machine learning engine. The data webpage receives data, processes it and sends the data required by the model, receives the results from the model in the server, and sends the results through sendDataToParent to the other data webpages.

Thus, server computing device services that deliver data, process data, or store data may be used in a very similar way as data webpages, and configurations of server applications and data webpage may be created with a variety of architectures.

The method 1500 may then proceed to block 1508 where the updated visualization on the second webpage is displayed. In an embodiment, at block 1508, the browser application 1304*a* may display the updated visualization on the second webpage. For example, the browser application 1304*a* may present the second webpage with the updated visualization.

In various embodiments, the method 1500 may iterate as data is being inputted. Furthermore, the method 1500 may be performed from the perspective of the second webpage where the second webpage receives a second data input and a visualization is updated on the first webpage based on the second data input. The updated second visualization on the second webpage may be displayed on the display device of the client computing device 1202/1300. As such, updating one webpage with a data input can cause the other webpage to update a visualization that is based on the data input to the receiving data webpage.

In yet another implementation of 1500, the first webpage may be a parent of the second webpage and a third webpage accessible at a third domain. For example, the second webpage and the third webpage may be embedded in the first webpage. The data input to the first webpage at block 1504 may cause, at block 1506, a visualization provided on the third webpage to update based on that data input. In other embodiments, the third webpage may embed the first webpage and the second webpage are embedded in the third webpage such that the third webpage is a parent webpage. The third webpage may include the protocol functions discussed herein such that the third webpage facilitates the updating the first visualization provided on the second webpage based on the first data input.

FIG. 3 illustrates an example of method 1500 of the present disclosure. FIG. 3 illustrates a web browser 300. The web browser 300 may obtain a first webpage 302 that may include a second webpage 304, a third webpage 306, and fourth webpage 308. In the illustrated example, the first webpage 302 embeds the second webpage 304, the third webpage 306, and the fourth webpage 308. During block 1504 of method 1500, a user may have adjusted the map in the second webpage 304 from a "Europe view" to a "North and South America view" displayed by the second webpage 304. As a result, the data exchange controller 1304*b* (e.g., the functions or event handler) may cause the data input to the second webpage 304 to be provided to the third webpage 306. As such, the third webpage 306 may be updated from a "Europe view" or other view to the "North and South America view" that mirrors the second webpage 304.

Thus, systems and methods of the present disclosure describe a data exchange system between applications of different domains. By communicating data between websites via the functions and event handlers according to embodiments of the present disclosure discussed above, technical improvements are made to website functionality and native applications. The data exchange system provides for data exchange between websites of different domains that does not require data to be reentered for each website that in a window or browser. This allows for developers to create an efficient flow of data between websites without the user's having to reenter data for each website. This reduces bandwidth and latency in the system as fewer inputs and calls to a server are needed as communication at the client computing device between websites may be enabled. These and other technical improvements will be recognized by those of skill in the art in possession of the present disclosure.

3. Self-Disabling or Self-Deleting Mobile Applications

Some embodiments include native mobile apps that are able to self-delete from the user's phone. The self-delete trigger may be based on a series of lists events that will terminate the life-cycle of an App (e.g., time, task, geolocation).

The techniques have a variety of use cases. For example, a company may send an app to all sales people of the company, and this App may runs a Christmas Promotion (e.g., exclusively) and include a milestone for the sales team. In some cases, this promotion app will self-delete from your phone at 24th of December when the milestone hits the deadline. In some cases, the application may delete conditionally on if a server indicates the sales team met a goal.

In some embodiments, the determination to delete a given application is made by code distributed with that application. For example, the application, upon being installed, may register with a scheduler service of the mobile computing device, and that scheduler service may execute the distributed code, for instance periodically, or in response to an event occurring, like a change in wireless network environment, a change in geolocation greater than a threshold, launching of the application, the mobile device entering a sleep state, or the mobile device waking from a sleep state. In some embodiments, the application code includes a disablement routine that executes upon such an event, for example as a background process on the mobile computing device. In some cases, the disablement routine deletes/disables the application without seeking the user's permission.

In some embodiments, the disablement routine may determine whether disablement criteria specified by the entity that provided the code have been satisfied. Disablement criteria may take a variety of different forms or combinations thereof, such as the following:

a criteria that a particular date and time have been reached and surpassed;

a criteria that the application has been distributed for more than a threshold amount of time to the mobile computing device;

a criteria that the application has been registered to the user of the mobile computing device for more than a threshold amount of time;

a criteria that the application has been in use by a user of the mobile computing device for more than a threshold amount of time;

a criteria that the mobile device is within a geographic area defined by a geofence;

a criteria that the mobile device is within range of a specified wireless network, for instance as indicated by Bluetooth identifier or Wi-Fi identifier embedded in a corresponding beacon broadcast by another device and received by the mobile device;

a criteria that the mobile device experience more than a threshold amount of failed logon attempts;

a criteria that the user failed to enter credentials into the application correctly more than a threshold amount of times;

a criteria that the application has been previously deleted from the mobile device or otherwise disabled;

a criteria that the application has been previously deleted or otherwise disabled for a given user account;

a criteria that the mobile device has been engaged to perform a particular task more than a threshold amount of times;

a criteria that the mobile device is currently engaging in a particular task;

a criteria that the mobile devices not within range of a different device broadcasting a wireless beacon with a beacon identifier that is specified by the criteria;

a criteria that a user has not performed a task with the mobile device, for instance reaching a particular level of performance within a game or workflow;

a criteria that a remote server provide a signal indicating the user or a group of users have achieved a sales goal/exercise goal/fundraising goal/workload goal, etc.;

a criteria that a battery level of the mobile device is above or below a threshold;

a criteria that the mobile device has wireless network access to the Internet of greater than a threshold quality;

a criteria that the mobile device have certain attributes, such as an operating system of greater than or less than a threshold version number or within a white list or out of a black list of versions, or a processor or memory with or without certain attributes;

a criteria that the user has not used the application within a threshold duration of time;

a criteria that the user has not used the application with greater than a threshold frequency over a trailing duration of time;

a criteria that the application has not been updated within a threshold duration of time; or a criteria that the user is not shared the application with more than a threshold amount of other users or received credit for a threshold amount of other user installations within a threshold duration of time.

In some embodiments, these criteria that may be combined in accordance with any permutation of the above, along with other criteria consistent with the above listing.

As noted above, some criteria relate to time. In some embodiments, a user may attempt to defeat such criteria by modifying a system clock of the mobile computing device. Accordingly, some embodiments may measure time according to some trusted external signal, for instance, a timing signal received from a global positioning system satellite. In some embodiments, the timing signal may be received with a signed cryptographic signature of a global satellite system indicating that the timing signal can be trusted, and some embodiments may verify the signed cryptographic signature with a public key of the global satellite system.

In some embodiments, the disablement routine may be executed by a remote server and the results of the routine communicated back to the mobile computing device. Designs in which the routine is executed on the mobile device, however, are expected to be more robust to attempts to defeat the disablement routine by users severing network contact.

In some embodiments, the disablement routine may delete data and code of the application upon determining that disablement criteria are satisfied. For example, some mobile devices may maintain a copy of the application in persistent storage, for instance in flash, and a copy of the executing code in dynamic memory, like dynamic random access memory. In some cases, and executing copy in dynamic random access memory may cause the mobile device to delete the version of persistent storage, such that once the copy in dynamic random access memory is deleted, for instance upon terminating the program, the application may be removed from the mobile computing device.

In some cases, the disablement routine may only delete data or code required by the application to operate, or portions of the application to operate, for instance to disable particular features (rather than deleting all code and data). For example, the application or portion thereof may verify that a cryptographic key is stored in memory of the mobile computing device before executing, and some embodiments may delete that cryptographic key to disable the code. In some embodiments, the cryptographic key may be stored in a trusted execution environment of the mobile computing device, executed by a different processor from a processor that executes the disablement routine or the application. Some embodiments may instruct the trusted execution environment processor to delete the key by communicating an interrupt via a buffer to the trusted execution environment that invokes a routine that deletes the key.

In some embodiments, the applications can be configured to receive, compile, and transmit the data according to the protocols and for use in the visualization schema disclosed in this specification, and then self-disable or self-delete according to the techniques taught herein.

4. Filtering and Transformation Sequence for Fast Exploration of Big Datasets

Based on the above-described efficient filtering and transformation protocol, or other protocols, some embodiments afford a system by which users may explore relatively large databases, such as distributed databases, by applying consecutive filters sequentially.

In some embodiments, the filtering process operates on different types of dimensions, including numerical, categorical, text, graphs and images.

In some embodiments, the filtering process is iterative and is based on two tasks: 1) applying a filter; and 2) executing accumulated filters.

In some embodiments, a session starts with an application receiving a random (e.g., pseudorandom) sample of a full dataset, e.g., sampling with or without replacement to obtain less than 50%, less than 10%, less than 1%, or less than 0.1% of records responsive to a query to the database. In some cases, the sample is representative, but proportionally relatively small in comparison to the full population being characterized. Example sizes expected to accord with commercial implementations include the following: Dataset size is 10 000 000 rows (e.g., records responsive to a query); and Sample: 20 000 (0.2%).

The application, in some embodiments, allows for filtering the data using all (or various subsets of) the available variables: selecting range of values from a number series, selecting a category value, etc. The application, in some embodiments, causes user devices to depict visualizations and statistics of the filtered loaded sample. As filters are applied the resulting (post filtering) dataset generally gets smaller.

At some point (e.g., after iteratively applying filters, adjusting those filters with modification, removal, or addition of filters, and viewing the results) the user is satisfied with the sequence of filters, or the obtained dataset is too small to trust the visuals and statistics. At that point, in some embodiments, the user executes the filters and transformations (e.g., by selecting input in a user interface to which embodiments are responsive), which may cause the user device to issue a request for the server, for instance by sending the description of the sequence of filters (using the filters and transformation protocol) and the filters and transformations may be (e.g., all) applied to the original complete dataset. Then a new sample may be created (e.g., at the server, at the user device, or in cooperation between these two devices) based on this new dataset, and returned to the client application.

These operations are exemplified by the following description continuing with the above numerical reference example:

Dataset size: 10 000 000 rows

Dataset with filters and transformations: 500 000 rows

Sample over filtered and transformed dataset: 20 000 (4%)

In this example, the new sample is then expected to be more representative respect to the transformed/filtered dataset.

Once the client application has loaded the new sample, in some embodiments, the process can start again. The user may apply more filters and transformations and eventually executes them, receiving a new sample, each time more representative, in some cases.

At some point the server may cease executing sampling because the filtered and transformed data is already small enough (for example contains less than 20 000 rows). In some embodiments, the server may compare a number of records in the dataset currently being explored (e.g., that passed a previously defined set of filters) to a threshold. In response to that number exceeding a threshold, embodiments may continue sampling in the manner described above. In response to that number being below the threshold, embodiments may cease sampling and operate on every record in the dataset currently being explored, e.g., depicting every record in visualizations and calculating statistics on every record.

In some embodiments, an application that integrates this technique is expected to avoid executing the complete sequence of filterings/transformations and executions on every record initially retrieved from the database. Some embodiments may maintain a transaction sequential log of historic operations, and embodiments may provide an interface by which users can go back into the sequence and start from another point and create a new branch. An advanced embodiment of this system afford the following features:

saving multiple different states (e.g., sequences), with name and comments;

saving branches, so there is a historic of which sequences derive from each other, e.g., in a tree data structure;

generating visualizations of the historic of sequences, including the different statistics calculated at different points in the path, and the user can use this visualization to navigate the program to previous states;

comparing and contrasting different states, e.g., the statistics of the different populations contrasted and visualized comparatively;

applying machine learning methods based on sequence of filterings, such as decision trees (e.g., trained with CART), to automatically explore sequence of filterings that predict a category (classification) or maximize a value (regression). Such sequences may be stored and compared with human produced sequences. In some cases, decision trees may be accessed as suggestion mechanism for human exploration, creating novel opportunities for human-machine collaboration;

as a filtering/transformation+filter execution is stored using the data transformation protocol, in some embodiments, this sequence is independent of the actual client application in which it the sequence has been built. This opens multiple opportunities exploited by some embodiments:
 a) one such client application can, externally, control the sequence of filters of another client application (using the data transformation protocol, ad in the context of multiple connected screens);
 b) multiple such application can be synchronized, allowing for multiple users exploration collaboration;

in some embodiments of the system, client application and server application may deliver statistics and metrics calculated on the filtered dataset before being sampled; when the sample is delivered to the client application it comes along with statistics based on the non sampled data, so accuracy is, in some cases, 100%;

on the server side, a sequence of filters may be applied optimally, sorting the sequence in a way the strongest filters (e.g., the ones that reduce the size of the data faster, which may be identified by testing and ranking the filters) are applied first. This may be done, in some cases, only with commutative transformations such as simple filters, or in some cases, with other filters;

an application may create different reports from the filtered populations, expressing the sequence of filterings/transformations and providing metrics, statistics and visualization.

Figure 7:
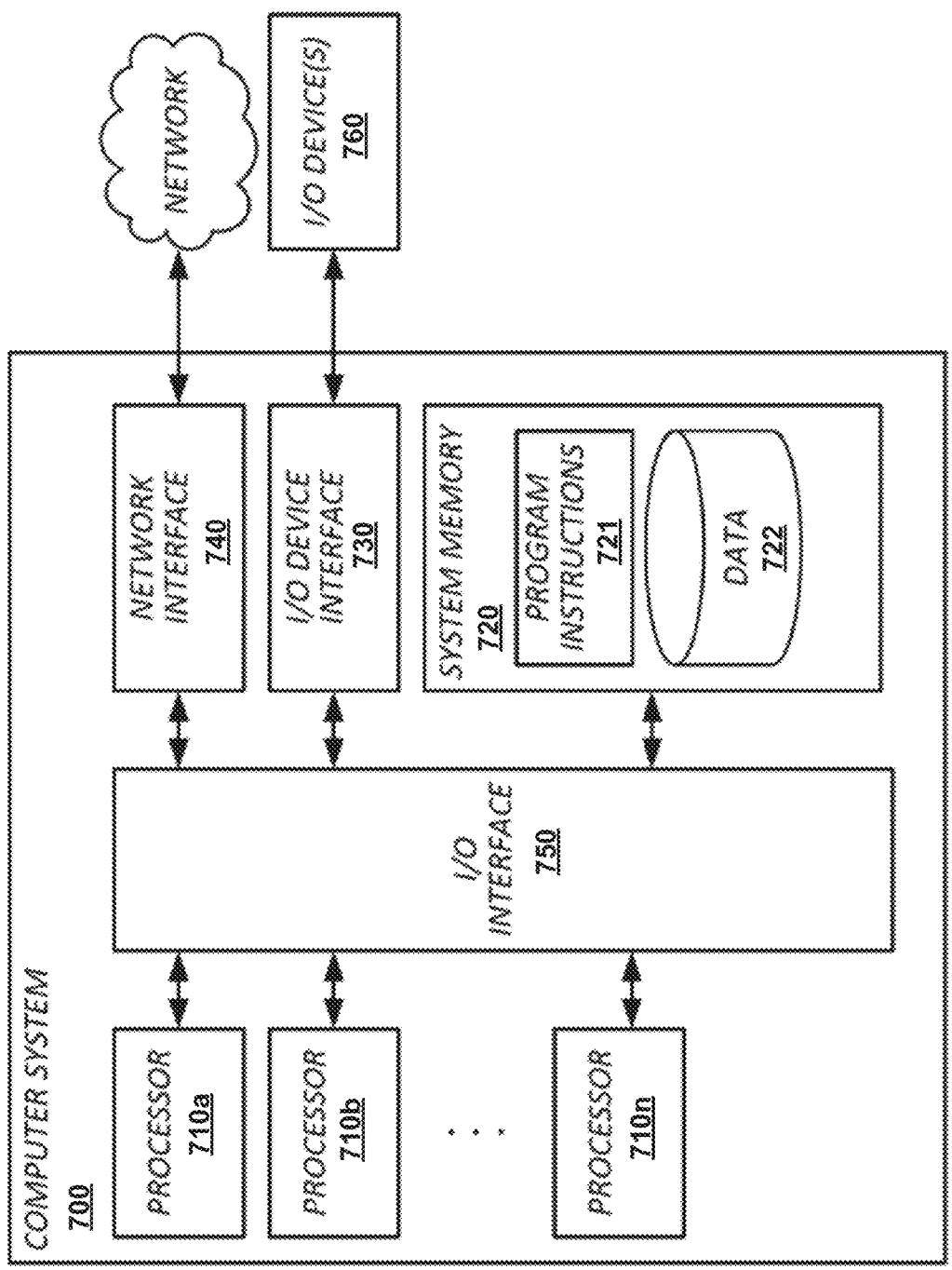
FIG. 7 illustrates an example of a computing device by which the techniques herein may be implemented.

With this cyclical process a user is expected to be able to quickly (e.g., with low latency, such as less than 5 seconds, less than 1 second, or less than 500 milliseconds in response to a user request) explore a huge dataset, doing things such as:

Looking for outliers found in the "corners" of the dataset, combination of low probability; this will reduce very quickly the size of the filtered dataset, and thus producing also very fast a dataset that's no longer sampled Finding population pockets that maximize or minimize certain properties Comparing multiple populations filtered following different sequences FIG. 7 is a diagram that illustrates an exemplary computing system 700 in accordance with embodiments of the present technique. Various portions of systems and methods described herein, may include or be executed on one or more computer systems similar to computing system 700. Further, processes and modules described herein may be executed by one or more processing systems similar to that of computing system 700.

Computing system 700 may include one or more processors (e.g., processors 710*a*-710*n*) coupled to system memory 720, an input/output I/O device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710*a*), or a multi-processor system including any number of suitable processors (e.g., 710*a*-710*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer system, for example, may be connected to computer system 700 via a network and network interface 740.

Network interface 740 may include a network adapter that provides for connection of computer system 700 to a network. Network interface may 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 721 or data 722. Program instructions 721 may be executable by a processor (e.g., one or more of processors 710a-710n) to implement one or more embodiments of the present techniques. Instructions 721 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 720 may include a non-transitory computer readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 750 may be configured to coordinate I/O traffic between processors 710a-710n, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700 or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative and is not intended to limit the scope of the techniques described herein. Computer system 700 may include any combination of devices or software that may perform or otherwise provide for the performance of the techniques described herein. For example, computer system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

The present techniques will be better understood with reference to the following enumerated embodiments.

A non-transitory, machine-readable medium storing instructions that, when executed by one or more processors, effectuate operations comprising: receiving, by a computer system, identifiers of a set of computing devices to participate in a cross-device data visualization session; sending, by the computer system, a data set to each of the computing devices and instructions to display a first portion of the data set; receiving, by the computer system, an interaction with one of the identified computing devices requesting at least some of the other identified computing devices to display a second, at least partially different, portion of the data set; and sending, by the computer system, an instruction to display the second, at least partially different, portion of the data set to the at least some of the other identified computing devices, wherein the instruction is sent without sending at least some of the second portion after receiving the interaction and the instruction causes the at least some of the other identified computing devices to execute the instructions on the at least some of the second portion of the data set that is present at the at least some of the other identified computing devices, wherein the display of the first portion of the data set and the display of the second at least partially different portion of the data set displays different aspects of data visualization.

The medium of embodiment 1, wherein the interaction with one of the computing devices is an implementation of at least one filter.

The medium of any one of embodiments 1-2, wherein the interaction with one of the computing devices requests at least some second set of other identified computing devices to display a third, at least partially different, portion of the data set, and the operations comprise: sending a second instruction to display the third, at least partially different, portion of the data set to the at least some second set of other computing devices, wherein the instruction is sent without sending at least some of the third portion after receiving the interaction.

The medium of any one of embodiments 1-2, wherein the operations further comprise: receiving a second interaction with the one of the computing devices requesting at least some different others of the computing devices to display a third, at least partially different, portion of the data set; and sending a second instruction to display the third, at least partially different portion of the data set to the at least some of the different other computing devices, wherein the second instruction is sent without sending at least some of the third portion after receiving the second interaction.

The medium of any one of embodiments 1-3, wherein the receiving identifiers step comprises: a transmission of a message from a computing device communicating the computing device's participation in the cross-device data visualization session; and the transmission of an acknowledgement message to the computing device.

The medium of any one of embodiments 1-4, wherein the instruction includes a transformation process on the data set such that none of the data set is provided in the instruction.

The medium of any one of embodiments 1-5, wherein the set of computing devices are connected via a secure connection established using a full-duplex communication protocol.

The medium of any one of embodiments 1-6, wherein none of the second portion of the data set is used in the first portion of the data set that is displayed.

The medium of any one of embodiments 1-7, wherein the operations further comprise: requesting at least some of the second portion of the data set that is not cached in cache memory of the computing device.

The medium of any one of embodiments 1-8, wherein the operations further comprise: determining, by the computer system, that the second portion of the data set is more likely to be accessed than a third portion of the data set based on the first portion of the data set being displayed, wherein the third portion of the data set is stored in a first cache storage that provides faster access than a second cache storage where the second portion of the data set is stored; and arranging, by the computer system, the second portion of the data set to reside on the first cache storage.

The medium of any one of embodiments 1-9, wherein the interaction includes receiving a change in data of the data set from a sensor.

A method, comprising: receiving, by a computer system, identifiers of a set of computing devices to participate in a cross-device data visualization session; sending, by the computer system, a data set to each of the computing devices and instructions to display a first portion of the data set; receiving, by the computer system, an interaction with one of the identified computing devices requesting at least some of the other identified computing devices to display a second, at least partially different, portion of the data set; and sending an instruction to display the second, at least partially different portion of the data set to the at least some of the other identified computing devices, wherein the instruction is sent without sending at least some of the second portion after receiving the interaction and the instruction causes the at least some of the other identified computing devices to execute the instructions on the at least some of the second portion of the data set that is present at the at least some of the other identified computing devices, wherein the display of the first portion of the data set and the display of the second at least partially different portion of the data set displays different aspects of data visualization.

The method of embodiment 12, wherein the interaction with one of the computing devices is an implementation of at least one filter.

The method of any one of embodiments 12-13, wherein the interaction with one of the computing devices requests at least some second set of other identified computing devices to display a third, at least partially different, portion of the data set, and the method further comprises: sending a second instruction to display the third, at least partially different, portion of the data set to the at least some second set of other computing devices, wherein the instruction is sent without sending at least some of the third portion after receiving the interaction.

The method of any one of embodiments 12-14, further comprising: receiving a second interaction with the one of the computing devices requesting at least some different others of the computing devices to display a third, at least partially different, portion of the data set; and sending a second instruction to display the third, at least partially different portion of the data set to the at least some of the different other computing devices, wherein the second instruction is sent without sending at least some of the third portion after receiving the second interaction.

The method of any one of embodiments 12-15, wherein the receiving identifiers step comprises: a transmission of a message from a computing device communicating the computing device's participation in the cross-device data visualization session; and the transmission of an acknowledgement message to the computing device.

The method of any one of embodiments 12-16, wherein the instruction includes a transformation process on the data set such that none of the data set is provided in the instruction.

The method of any one of embodiments 12-17, wherein none of the second portion of the data set is used in the first portion of the data set that is displayed.

The method of any one of embodiments 12-18, further comprising: requesting at least some of the second portion of the data set that is not cached in cache memory of the computing device.

The method of any one of embodiments 12-19, further comprising: determining, by the computer system, that the second portion of the data set is more likely to be accessed than a third portion of the data set based on the first portion of the data set being displayed, wherein the third portion of the data set is stored in a first cache storage that provides faster access than a second cache storage where the second portion of the data set is stored; and arranging, by the computer system, the second portion of the data set to reside on the first cache storage.

What is claimed is:

1. A non-transitory, machine-readable medium storing instructions that, when executed by one or more processors, effectuate operations comprising:

receiving, by a computer system, identifiers of a set of computing devices to participate in a cross-device data visualization session provided by a cross-device data visualization application that includes a plurality of data sub-applications, wherein each data sub-application of the plurality of data sub-applications includes different instructions that operate independently from each other, each data sub-application has at least one of an input or an output that is connected to another data sub-application according to a data sub-application manifest provided to each of the set of computing devices, and the plurality of data sub-applications are distributed across the set of computing devices;

sending, by the computer system, a data set to each of the computing devices and instructions to display a first portion of the data set, wherein the instructions to display the first portion are based on the different instructions provided by each data sub-application;

receiving, by the computer system, an interaction with one of the identified computing devices via the data sub-application for that computing device requesting at least some of the other data sub-application of the other identified computing devices to display a second, at least partially different, portion of the data set; and sending, by the computer system, a second instruction to display the second, at least partially different, portion of the data set to the at least some of the other data sub-applications provided by the identified computing devices, wherein the second instruction is sent without sending at least some of the second portion of the data set after receiving the interaction and the second instruction causes the at least some of the other identified computing devices to execute the instructions provided by the data sub-applications operating on those other identified computing devices on the at least some of the second portion of the data set that is present at the at least some of the other identified computing devices, wherein the display of the first portion of the data set and the display of the second at least partially different portion of the data set displays different aspects of data visualization.

2. The medium of claim 1, wherein the interaction with one of the computing devices is an implementation of at least one filter.

3. The medium of claim 1, wherein the interaction with one of the computing devices requests at least some second set of other identified computing devices to display a third, at least partially different, portion of the data set, and the operations comprise:

sending a third instruction to display the third, at least partially different, portion of the data set to the at least some second set of other computing devices, wherein the instruction is sent without sending at least some of the third portion after receiving the interaction.

4. The medium of claim 1, wherein the operations further comprise:

receiving a second interaction with the one of the computing devices requesting at least some different others of the computing devices to display a third, at least partially different, portion of the data set; and sending a third instruction to display the third, at least partially different portion of the data set to the at least some of the different other computing devices, wherein the third instruction is sent without sending at least some of the third portion after receiving the second interaction.

5. The medium of claim 1, wherein the second instruction includes a transformation process on the data set such that none of the data set is provided in the instruction.

6. The medium of claim 1, wherein the set of computing devices are connected via a secure connection established using a full-duplex communication protocol.

7. The medium of claim 1, wherein none of the second portion of the data set is used in the first portion of the data set that is displayed.

8. The medium of claim 1, wherein the operations further comprise:
  requesting at least some of the second portion of the data set that is not cached in cache memory of the computing device.

9. The medium of claim 1, wherein the operations further comprise:
  determining, by the computer system, that the second portion of the data set is more likely to be accessed than a third portion of the data set based on the first portion of the data set being displayed, wherein the third portion of the data set is stored in a first cache storage that provides faster access than a second cache storage where the second portion of the data set is stored; and
  arranging, by the computer system, the second portion of the data set to reside on the first cache storage.

10. The medium of claim 1, wherein the interaction includes receiving a change in data of the data set from a sensor.

11. The medium of claim 1, wherein the plurality of data sub-applications are distributed across the set of computing devices according to a negotiation between the set of computing devices that determines which data sub-applications of the plurality of data sub-applications should be installed on which computing device based on resources or select attributes of those computing devices.

12. The medium of claim 1, wherein the data sub-application manifest provides a loop-free directed graph of inputs and outputs of the plurality of data sub-applications.

13. A method, comprising:
  receiving, by a computer system, identifiers of a set of computing devices to participate in a cross-device data visualization session provided by a cross-device data visualization application that includes a plurality of data sub-applications, wherein each data sub-application of the plurality of data sub-applications includes different instructions that operate independently from each other, each data sub-application has at least one of an input or an output that is connected to another data sub-application according to a data sub-application manifest provided to each of the set of computing devices, and the plurality of data sub-applications are distributed across the set of computing devices;
  sending, by the computer system, a data set to each of the computing devices and instructions to display a first portion of the data set, wherein the instructions to display the first portion are based on the different instructions provided by each data sub-application;
  receiving, by the computer system, an interaction with one of the identified computing devices via the data sub-application for that computing device requesting at least some of the other data sub-application of the other identified computing devices to display a second, at least partially different, portion of the data set; and
  sending, by the computer system, a second instruction to display the second, at least partially different, portion of the data set to the at least some of the other data sub-applications provided by the identified computing devices, wherein the second instruction is sent without sending at least some of the second portion of the data set after receiving the interaction and the second instruction causes the at least some of the other identified computing devices to execute the instructions provided by the data sub-applications operating on those other identified computing devices on the at least some of the second portion of the data set that is present at the at least some of the other identified computing devices,
  wherein the display of the first portion of the data set and the display of the second at least partially different portion of the data set displays different aspects of data visualization.

14. The method of claim 13, wherein the interaction with one of the computing devices is an implementation of at least one filter.

15. The method of claim 13, wherein the interaction with one of the computing devices requests at least some second set of other identified computing devices to display a third, at least partially different, portion of the data set, and the method further comprises:
  sending a third instruction to display the third, at least partially different, portion of the data set to the at least some second set of other computing devices, wherein the instruction is sent without sending at least some of the third portion after receiving the interaction.

16. The method of claim 13, further comprising:
  receiving a second interaction with the one of the computing devices requesting at least some different others of the computing devices to display a third, at least partially different, portion of the data set; and
  sending a third instruction to display the third, at least partially different portion of the data set to the at least some of the different other computing devices, wherein the third instruction is sent without sending at least some of the third portion after receiving the second interaction.

17. The method of claim 13, wherein the second instruction includes a transformation process on the data set such that none of the data set is provided in the instruction.

18. The method of claim 13, wherein none of the second portion of the data set is used in the first portion of the data set that is displayed.

19. The method of claim 13, further comprising:
  requesting at least some of the second portion of the data set that is not cached in cache memory of the computing device.

20. The method of claim 13, further comprising:
  determining, by the computer system, that the second portion of the data set is more likely to be accessed than a third portion of the data set based on the first portion of the data set being displayed, wherein the third portion of the data set is stored in a first cache storage that provides faster access than a second cache storage where the second portion of the data set is stored; and
  arranging, by the computer system, the second portion of the data set to reside on the first cache storage.

* * * * *